(12) United States Patent
Ryman

(10) Patent No.: US 9,130,903 B2
(45) Date of Patent: Sep. 8, 2015

(54) UNIFIED OUT OF BAND MANAGEMENT SYSTEM FOR DESKTOP AND SERVER SESSIONS

(75) Inventor: Paul Ryman, Dural (AU)

(73) Assignee: Citrix Systems, Inc., Fort Lauderdale, FL (US)

(*) Notice: Subject to any disclaimer, the term of this patent is extended or adjusted under 35 U.S.C. 154(b) by 1481 days.

(21) Appl. No.: 12/496,353

(22) Filed: Jul. 1, 2009

(65) Prior Publication Data

US 2011/0004680 A1    Jan. 6, 2011

(51) Int. Cl.
  *G06F 9/455* (2006.01)
  *G06F 9/46* (2006.01)
  *H04L 29/08* (2006.01)
  *G06F 9/44* (2006.01)

(52) U.S. Cl.
  CPC ............ *H04L 67/025* (2013.01); *G06F 9/4445* (2013.01); *H04L 67/14* (2013.01); *H04L 67/148* (2013.01); *G06F 9/45558* (2013.01); *G06F 2009/4557* (2013.01); *G06F 2009/45575* (2013.01)

(58) Field of Classification Search
  CPC ....... G06F 9/50; G06F 9/5077; G06F 9/4445; G06F 9/455; H04L 67/14; H04L 67/148
  See application file for complete search history.

(56) References Cited

U.S. PATENT DOCUMENTS

| | | | |
|---|---|---|---|
| 5,949,975 A | 9/1999 | Batty et al. | |
| 6,571,245 B2 | 5/2003 | Chun et al. | |
| 7,552,218 B2 | 6/2009 | Kaluskar et al. | |
| 7,840,683 B2 | 11/2010 | Zhang | |
| 2003/0069923 A1 | 4/2003 | Peart | |
| 2003/0069924 A1 | 4/2003 | Peart et al. | |
| 2004/0031058 A1 | 2/2004 | Reisman | |
| 2005/0038848 A1 | 2/2005 | Kaluskar et al. | |

(Continued)

FOREIGN PATENT DOCUMENTS

| CA | 2349666 | * | 6/2000 |
|---|---|---|---|
| WO | WO 00/33510 | * | 6/2000 |

OTHER PUBLICATIONS

VMware (user's manual GSX server, Version 2.5.1, 2003, pp. 1-20 and pp. 141-197).*

(Continued)

*Primary Examiner* — Meng An
*Assistant Examiner* — Caroline H Arcos
(74) *Attorney, Agent, or Firm* — John D. Lanza; Foley & Lardner LLP

(57) ABSTRACT

A method for using standards-based functionality to provide unified management for a plurality of remote desktop sessions includes executing an enhanced management access point on a first physical machine. The method includes monitoring a plurality of desktop sessions including a desktop session executing on one of a second physical machine and a virtual machine executing on the second physical machine. The desktop session provides access to at least one application or file. The method includes determining a first level of activity of the desktop session. A level of activity may be one of: active, inactive, hibernating and standby. The method includes receiving a notification of a migration of the desktop session to a third physical machine, the migrated desktop session maintaining the first level of activity. The method includes instructing a management component on the third physical machine to modify the migrated desktop session to a second level of activity.

22 Claims, 8 Drawing Sheets

(56) References Cited

U.S. PATENT DOCUMENTS

| | | | |
|---|---|---|---|
| 2006/0053216 A1* | 3/2006 | Deokar et al. | 709/223 |
| 2006/0259612 A1* | 11/2006 | De Oliveira et al. | 709/224 |
| 2007/0073896 A1* | 3/2007 | Rothman et al. | 709/232 |
| 2007/0192329 A1* | 8/2007 | Croft et al. | 707/10 |
| 2007/0198656 A1* | 8/2007 | Mazzaferri et al. | 709/218 |
| 2007/0233455 A1 | 10/2007 | Zimmer et al. | |
| 2007/0286215 A1* | 12/2007 | Morris | 370/401 |
| 2008/0162956 A1* | 7/2008 | Bozek et al. | 713/310 |
| 2009/0006537 A1 | 1/2009 | Palekar et al. | |
| 2009/0063751 A1* | 3/2009 | Dow | 711/6 |
| 2009/0106571 A1* | 4/2009 | Low et al. | 713/310 |
| 2010/0299720 A1* | 11/2010 | John et al. | 726/3 |

OTHER PUBLICATIONS

Avocent Mergepoint service processor managers, Product overview, available at http://www.avocent.com/MergePoint.aspx.

* cited by examiner

UNIFIED OUT OF BAND MANAGEMENT SYSTEM FOR DESKTOP AND SERVER SESSIONS

FIELD OF THE DISCLOSURE

This disclosure generally relates to systems and methods for managing a plurality of machines. In particular, this disclosure relates to systems and methods for providing unified management of desktop sessions.

BACKGROUND

In a conventional networked computing environment including a plurality of physical machines, a machine in the plurality of physical machines may be in an active, inactive, hibernating or standby state. The state of each machine may reflect a level of activity on each machine. A machine in the plurality of physical machines may be managed via a management component, such as a baseboard management controller (BMC) executing on the machine or a service processor executing on another machine. An external process may communicate with a management controller of a machine to transition the machine from a first state to a second state. In some environments, a machine may be managed while in an inactive state (e.g., without the operating system executing) as long as the management controller is powered and operational. For example, in one embodiment, a chipset supporting Active Management Technology (AMT) may include a management controller and an external process may manage the state of the machine through the chipset using directives based on standards such as Desktop and mobile Architecture for System Hardware (DASH) and System Management Architecture for Server Hardware (SMASH). However, conventional environments do not typically provide analogous processes extending out-of-band management to include functionality for managing migration of user sessions, such as a desktop session, or for monitoring a state of such a session after migration between machines.

BRIEF SUMMARY

In one aspect, a method for using standards-based functionality to provide unified management, via out of band management communication, for a plurality of remote desktop sessions includes executing an enhanced management access point on a first physical machine. The method includes monitoring, by the enhanced management access point, a plurality of desktop sessions including a desktop session executing on one of a second physical machine and a virtual machine executing on the second physical machine. The desktop session may provide access to at least one application or file. The method includes determining, by the enhanced management access point, a first level of activity of the desktop session. The first level of activity can be one of: active, inactive, hibernating and standby. The method includes receiving, by the enhanced management access point, a notification of a migration of the desktop session to a third physical machine. The migrated desktop session may maintain the first level of activity on the third physical machine. The method includes instructing, by the enhanced management access point, a management component on the third physical machine to modify the migrated desktop session from the first level of activity to a second level of activity. The second level of activity is one of: active, inactive, hibernating and standby.

In one embodiment, the method includes monitoring a plurality of server sessions including a server session executing on one of a second physical machine and a virtual machine executing on the second physical machine. The server session can provide access to at least one application or file. In another embodiment, the method includes discovery and location of the plurality of desktop sessions. In still another embodiment, the method includes one of polling and querying at least one physical machine providing the plurality of desktop sessions. In yet another embodiment, the method includes communicating with at least one of: a virtualization system, a virtual desktop management system, a provisioning system, and a directory service. In other embodiments, the method includes determining that the desktop session is not accessible and determining the first level of activity of the desktop session from cached information.

In one embodiment, the method includes identifying the second physical machine providing the desktop session, the desktop session executing on one of the second physical machine and the virtual machine executing on the second physical machine. In another embodiment, the method includes at least one of polling and querying a management process for the notification of the migration of the desktop session. In still another embodiment, the management process is provided by at least one of: a virtualization system, a virtual desktop management system, a provisioning system, and a directory service.

In one embodiment, the method includes instructing the management component on the third physical machine using at least one of: a standards-based specification and a proprietary specification. In another embodiment, the method includes instructing the management component on the third physical machine using at least one of: Desktop and mobile Architecture for System Hardware (DASH) and System Management Architecture for Server Hardware (SMASH) specifications. In still another embodiment, the method includes instructing the management component via at least one of a provisioning system and a directory service. In yet another embodiment, the method includes managing a desktop session executing on the second physical machine and a desktop session executing on the virtual machine in substantially the same manner.

In another aspect, a method for using standards-based functionality to provide unified management, via out of band management communication, for a plurality of remote desktop sessions includes executing an enhanced management access point on a first physical machine. The method includes monitoring, by the enhanced management access point, a plurality of desktop sessions including a desktop session executing on one of a second physical machine and a virtual machine executing on the second physical machine. The desktop session may provide access to at least one application or file. The method includes determining, by the enhanced management access point, a first level of activity of the desktop session, wherein the first level of activity is one of: active, inactive, hibernating and standby. The method includes receiving, by the enhanced management access point, a notification of a migration of the desktop session to a virtual machine executing on a third physical machine. The migrated desktop session may maintain the first level of activity on the virtual machine executing on the third physical machine. The method includes instructing, by the enhanced management access point, a hypervisor managing the virtual machine executing on the third physical machine to modify the migrated desktop session from the first level of activity to a second level of activity. The second level of activity may be one of: active, inactive, hibernating and standby.

In one embodiment, the method includes monitoring a plurality of server sessions including a server session executing on one of a second physical machine and a virtual machine executing on the second physical machine. The server session can provide access to at least one application or file. In another embodiment, the method includes discovery and location of the plurality of desktop sessions. In still another embodiment, the method includes one of polling and querying at least one physical machine providing the plurality of desktop sessions. In yet another embodiment, the method includes communicating with at least one of: a virtualization system, a virtual desktop management system, a provisioning system, and a directory service. In other embodiments, the method includes determining that the desktop session is not accessible and determining the first level of activity of the desktop session from cached information.

In one embodiment, the method includes identifying the second physical machine providing the desktop session, the desktop session executing on one of the second physical machine and the virtual machine executing on the second physical machine. In another embodiment, the method includes at least one of polling and querying a management process for the notification of the migration of the desktop session. In still another embodiment, the management process is provided by at least one of: a virtualization system, a virtual desktop management system, a provisioning system, and a directory service.

In one embodiment, the method includes instructing the management component on the third physical machine using at least one of: a standards-based specification and a proprietary specification. In another embodiment, the method includes instructing the management component on the third physical machine using at least one of: Desktop and mobile Architecture for System Hardware (DASH) and System Management Architecture for Server Hardware (SMASH) specifications. In still another embodiment, the method includes instructing the hypervisor via at least one of: a virtualization system, a virtual desktop management system, a provisioning system, and a directory service. In yet another embodiment, the method includes managing a desktop session executing on the second physical machine and a desktop session executing on the virtual machine in substantially the same manner.

In still another aspect, a system for using standards-based functionality to provide unified management, via out of band management communication, for a plurality of remote desktop sessions by an enhanced management access point executing on a first physical machine, includes means for executing an enhanced management access point on a first physical machine. The system includes means for monitoring a plurality of desktop sessions including a desktop session executing on one of a second physical machine and a virtual machine executing on the second physical machine. The desktop session may provide access to at least one application or file. The system includes means for determining a first level of activity of the desktop session The first level of activity can be one of: active, inactive, hibernating and standby. The system includes means for receiving a notification of a migration of the desktop session to a third physical machine, the migrated desktop session maintaining the first level of activity on the third physical machine. The system includes means for instructing a management component on the third physical machine to modify the migrated desktop session from the first level of activity to a second level of activity, wherein the second level of activity is one of: active, inactive, hibernating and standby.

In yet another aspect, a system for using standards-based functionality to provide unified management, via out of band management communication, for a plurality of remote desktop sessions by an enhanced management access point executing on a first physical machine, includes means for executing an enhanced management access point on a first physical machine. The system includes means for monitoring a plurality of desktop sessions including a desktop session executing on one of: a second physical machine and a virtual machine executing on the second physical machine. The desktop session may provide access to at least one application or file. The system includes means for determining a first level of activity of the desktop session. The first level of activity can be one of: active, inactive, hibernating and standby. The system includes means for receiving a notification of a migration of the desktop session to a virtual machine executing on a third physical machine, the migrated desktop session maintaining the first level of activity on the virtual machine executing on the third physical machine. The system includes means for instructing a hypervisor managing the virtual machine executing on the third physical machine to modify the migrated desktop session from the first level of activity to a second level of activity, wherein the second level of activity is one of: active, inactive, hibernating and standby.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
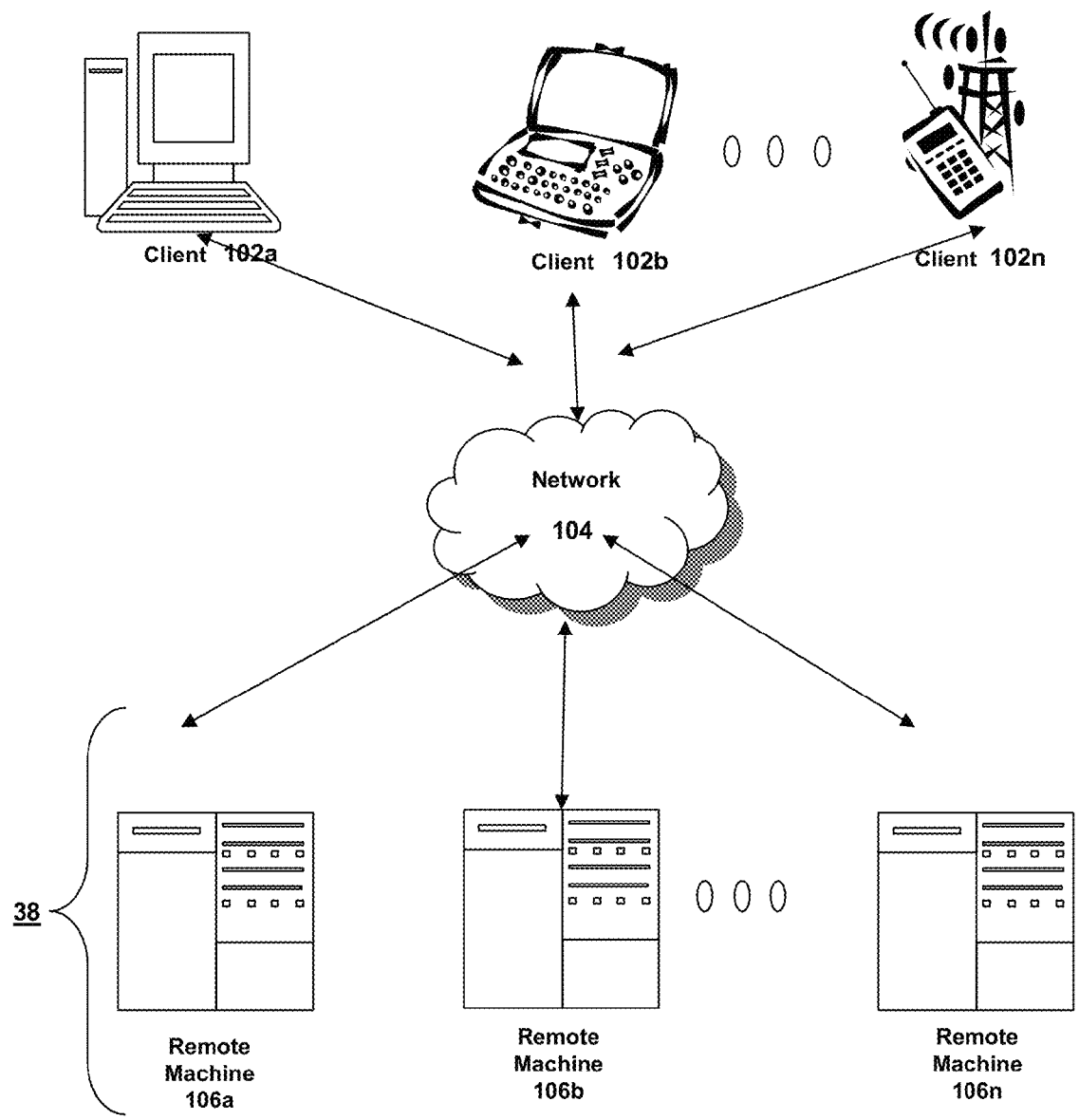
FIG. 1A is a block diagram depicting an embodiment of a network environment comprising client machines in communication with remote machines.

Referring now to FIG. 1A, an embodiment of a network environment is depicted. In brief overview, the network environment includes one or more clients 102a-102n (also generally referred to as local machine(s) 102, node(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node 102 seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38 or a machine farm 38. In another of these embodiments, the remote machines 106 may be geographically dispersed. In other embodiments, a server farm 38 may be administered as a single entity. In still other embodiments, the server farm 38 includes a plurality of server farms 38. The remote machines 106 within each server farm 38 can be heterogeneous—one or more of the remote machines 106 or machines 106 can operate according to one type of operating system platform (e.g., WINDOWS NT, manufactured by Microsoft Corp. of Redmond, Wash.), while one or more of the other remote machines 106 can operate on according to another type of operating system platform (e.g., Unix or Linux).

In one embodiment, remote machines 106 in the server farm 38 may be stored in high-density rack systems, along with associated storage systems, and located in an enterprise data center. In this embodiment, consolidating the remote machines 106 in this way may improve system manageability, data security, the physical security of the system, and system performance by locating remote machines 106 and high performance storage systems on localized high performance networks. Centralizing the remote machines 106 and storage systems and coupling them with advanced system management tools allows more efficient use of server resources.

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection. Additionally, a heterogeneous server farm 38 may include one or more remote machines 106 operating according to a type of operating system, while one or more other remote machines 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif., the Xen hypervisor, an open source product whose development is overseen by Citrix Systems, Inc., the VirtualServer or virtual PC hypervisors provided by Microsoft, or others.

In order to manage a server farm 38, at least one aspect of the performance of remote machines 106 in the server farm 38 should be monitored. Typically, the load placed on each remote machine 106 or the status of sessions running on each remote machine 106 is monitored. In some embodiments, a centralized service may provide management for server farm 38. The centralized service may gather and store information about a plurality of remote machines 106, respond to requests for access to resources hosted by remote machines 106, and enable the establishment of connections between client machines 102 and remote machines 106.

Alternatively, management of the server farm 38 may be de-centralized. For example, one or more remote machines 106 may comprise components, subsystems and modules to support one or more management services for the server farm 38. In one of these embodiments, one or more remote machines 106 provide functionality for management of dynamic data, including techniques for handling failover, data replication, and increasing the robustness of the server farm 38. Each remote machine 106 may communicate with a persistent store and, in some embodiments, with a dynamic store.

Remote machine 106 may be a file server, application server, web server, proxy server, appliance, network appliance, gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In some embodiments, a hypervisor executes on a remote machine 106 executing an operating system. In one of these embodiments, a remote machine 106 executing an operating system and a hypervisor may be said to have a host operating system (the operating system executing on the machine), and a guest operating system (an operating system executing within a computing resource partition provided by the hypervisor). In other embodiments, a hypervisor interacts directly with hardware on a remote machine 106, instead of executing on a host operating system. In one of these embodiments, the hypervisor may be said to be executing on "bare metal," referring to the hardware comprising the remote machine 106.

In one embodiment, a remote machine 106 may include a directory service, such as a MICROSOFT ACTIVE DIRECTORY service. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 includes an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In one embodiment, the remote machine 106 provides the functionality of a web server. In another embodiment, the remote machine 106a receives requests from the client 102, forwards the requests to a second remote machine 106b and responds to the request by the client 102 with a response to the request from the second remote machine 106b. In still another embodiment, a remote machine 106 acquires an enumeration of applications available to the client 102 and address information associated with a remote machine 106' hosting an application identified by the enumeration of applications. In yet another embodiment, the remote machine 106 presents a response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

In one embodiment, a computing device 100 may request resources from a remote machine 106, while providing the functionality of a remote machine 106 to a client 102b. In such an embodiment, the computing device 100 may be referred to as a client 102a with respect to data received from the remote machine 106 (which may be referred to as a server) and the computing device 100 may be referred to as a server 106 with respect to the client 102b. In another embodiment, the client 102 may request resources from the remote machine 106 on behalf of a user of the client 102.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME, CITRIX PRESENTATION SERVER, CITRIX XENAPP, CITRIX XENDESKTOP and/or any of the MICROSOFT WINDOWS Terminal Services manufactured by the Microsoft Corporation. In another embodiment, the application is an ICA client, developed by Citrix Systems, Inc., of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc., of Santa Clara, Calif., or Microsoft Office LIVE MEETING provided by Microsoft Corporation of Redmond, Wash.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
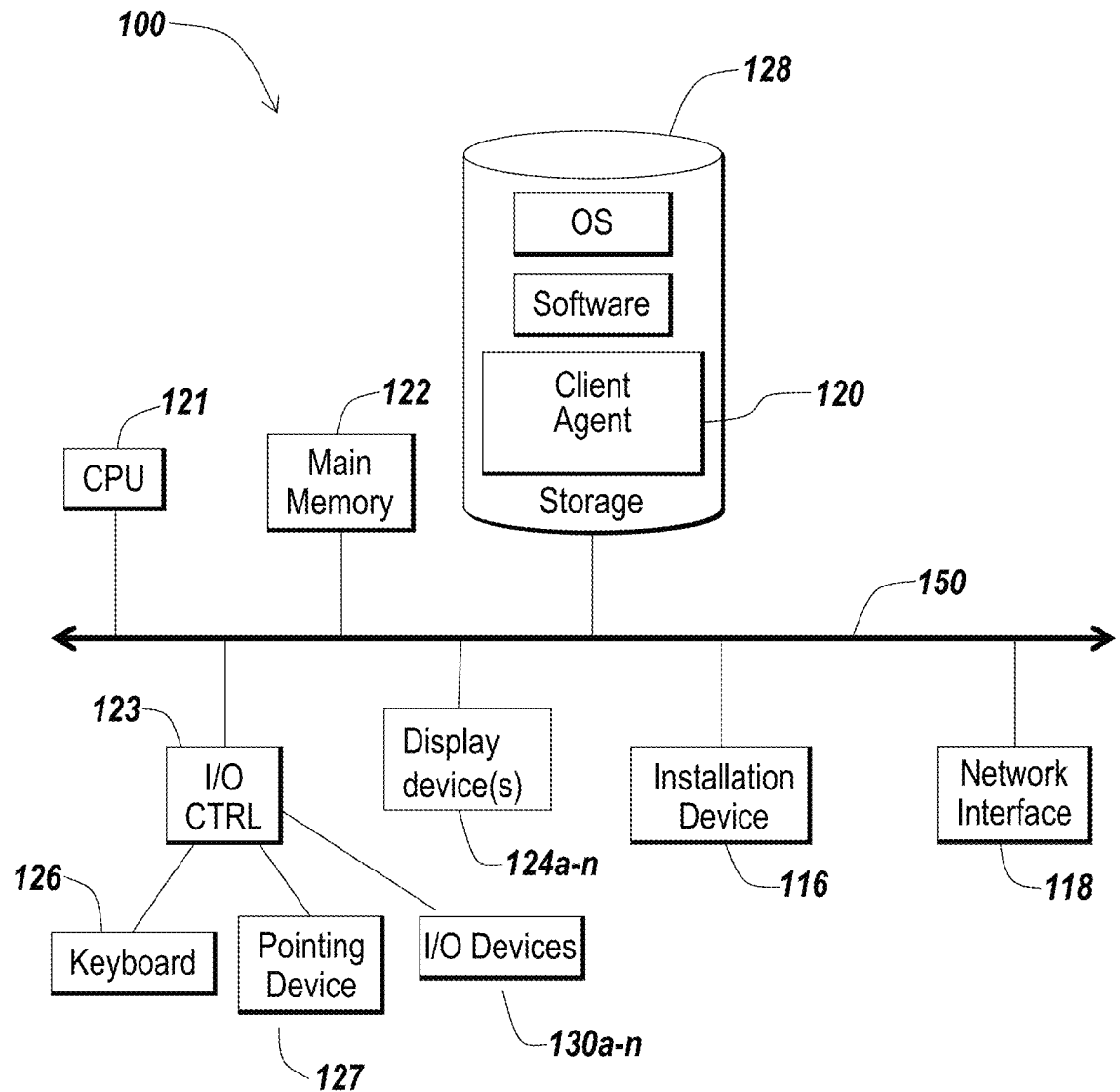
FIGS. 1B-1E are block diagrams depicting embodiments of computing devices useful in connection with the methods and systems described herein.
Figure 1C:
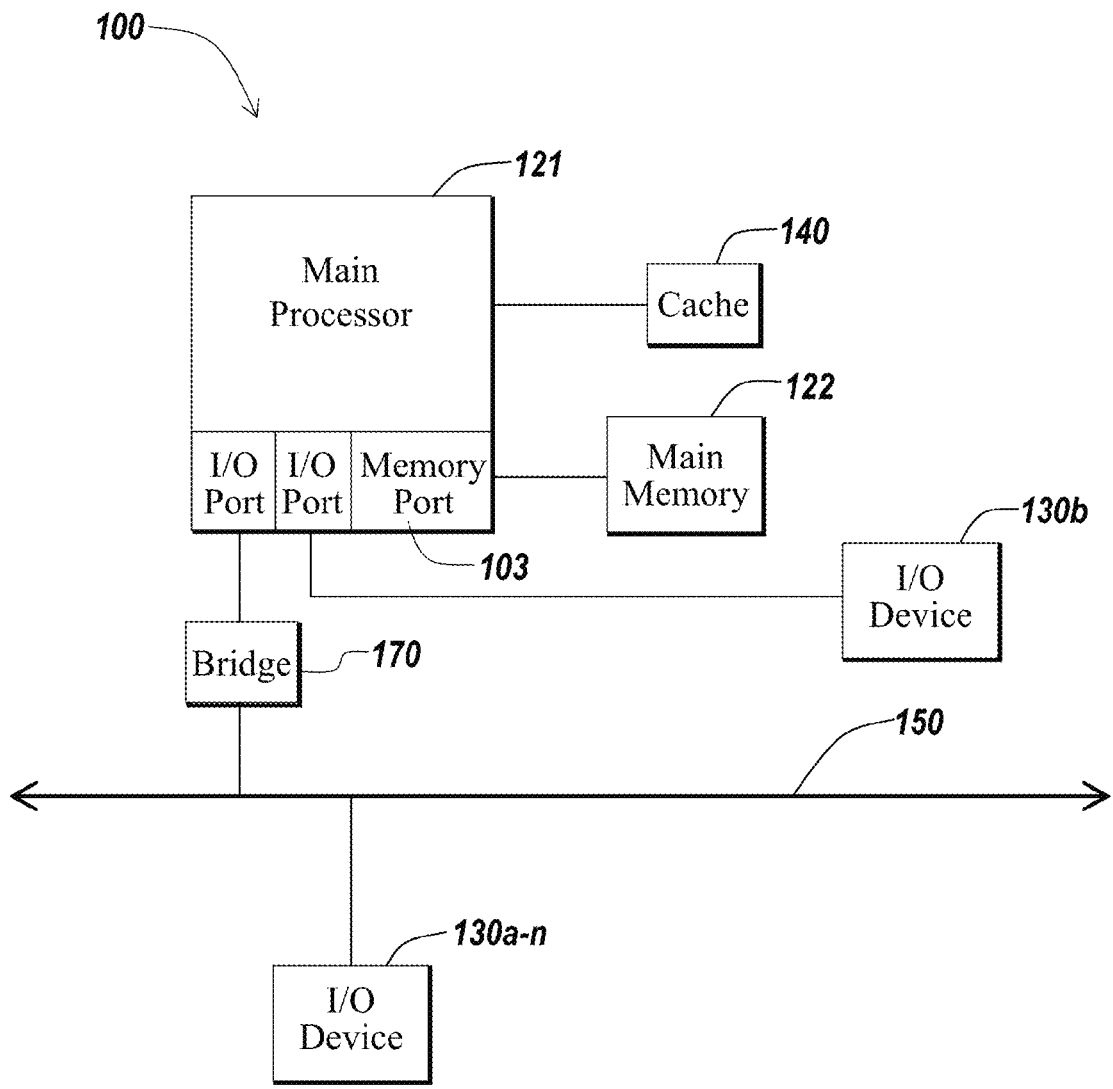

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as:

those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

Figure 1D:
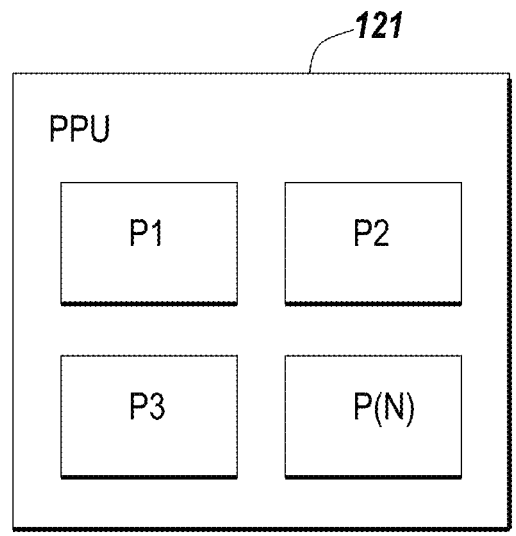

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
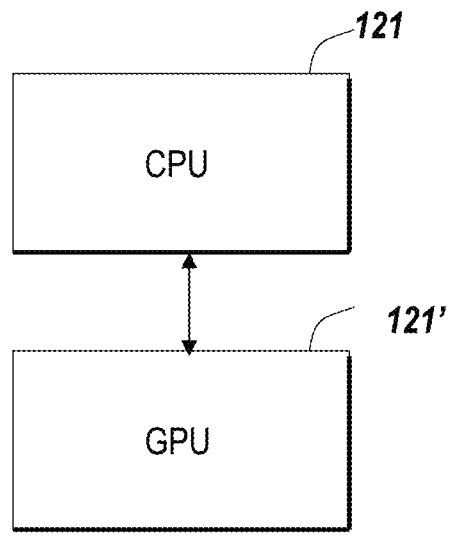

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Figure 1F:
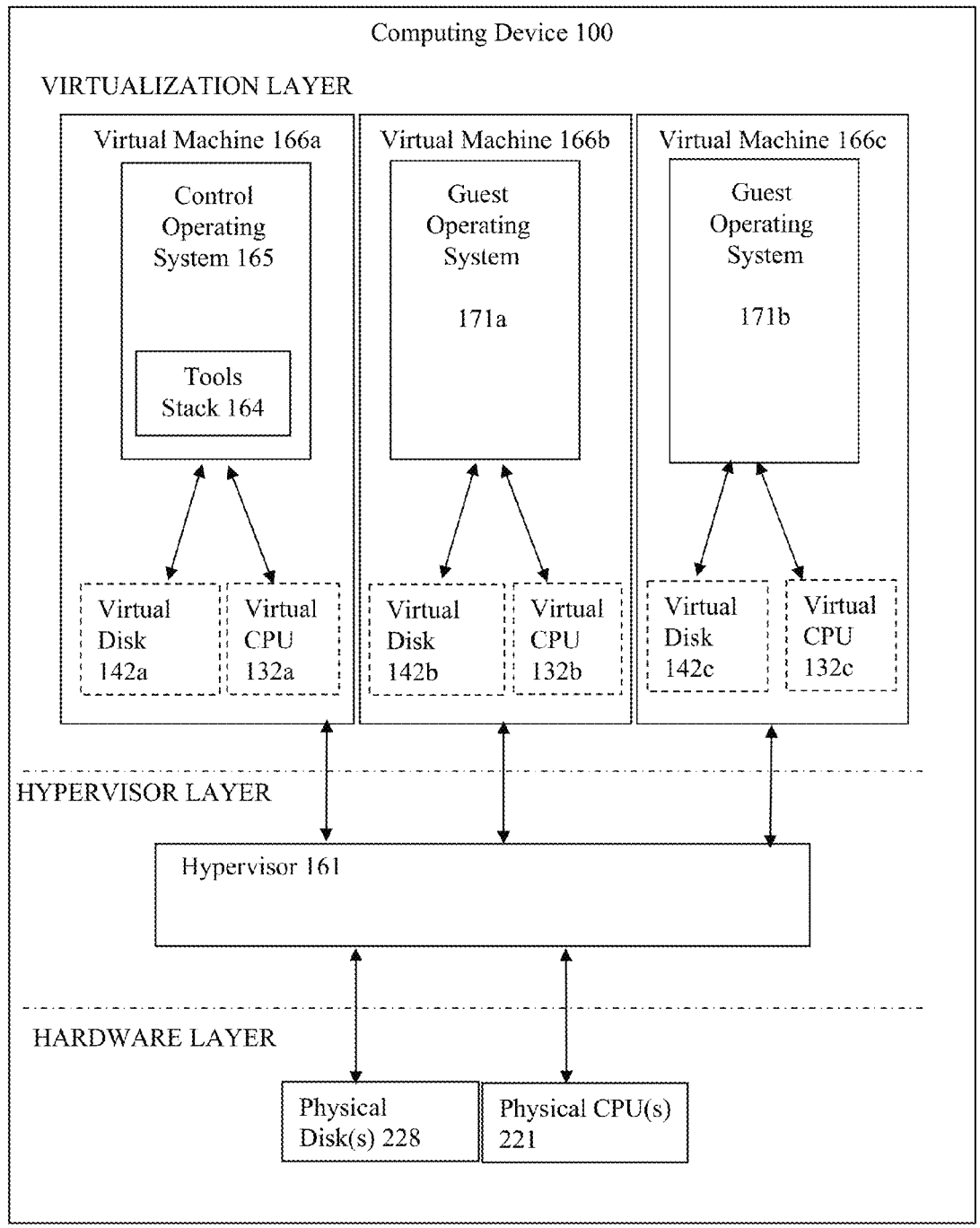
FIG. 1F is a block diagram depicting an embodiment of a virtualization environment.

Referring now to FIG. 1F, a block diagram depicts one embodiment of a virtualization environment. In brief overview, a computing device 100 includes a hypervisor layer, a virtualization layer, and a hardware layer. The hypervisor layer includes a hypervisor 161 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 165, 171a, 171b and a plurality of virtual resources allocated to the at least one operating system 165, 171a, 171b. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 165, 171a, 171b may be referred to as a virtual machine 166. A virtual machine 166 may include a control operating system 165 in communication with the hypervisor 161 and used to execute applications for managing and configuring other virtual machines on the computing device 100.

Referring now to FIG. 1F, and in greater detail, a hypervisor 161 may provide virtual resources to an operating system in any manner that simulates the operating system having access to a physical device. A hypervisor 161 may provide virtual resources to any number of guest operating systems 171a, 171b (generally 171). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 161 executes within an operating system executing on a computing device. In one of these embodiments, a computing device executing an operating system and a hypervisor 161 may be said to have a host operating system (the operating system executing on the computing device), and a guest operating system (an operating system executing within a computing resource partition provided by the hypervisor 161). In other embodiments, a hypervisor 161 interacts directly with hardware on a computing device, instead of executing on a host operating system. In one of these embodiments, the hypervisor 161 may be said to be executing on "bare metal," referring to the hardware comprising the computing device.

In some embodiments, a hypervisor 161 may create a virtual machine 166a-c (generally 166) in which an operating system 171 executes. In one of these embodiments, for example, the hypervisor 161 loads a virtual machine image to create a virtual machine 166. In another of these embodiments, the hypervisor 161 executes an operating system 171 within the virtual machine 166. In still another of these embodiments, the virtual machine 166 executes an operating system 171.

In some embodiments, the hypervisor 161 controls processor scheduling and memory partitioning for a virtual machine 166 executing on the computing device 100. In one of these embodiments, the hypervisor 161 controls the execution of at least one virtual machine 166. In another of these embodiments, the hypervisor 161 presents at least one virtual machine 166 with an abstraction of at least one hardware resource provided by the computing device 100. In other embodiments, the hypervisor 161 controls whether and how physical processor capabilities are presented to the virtual machine 166.

A control operating system 165 may execute at least one application for managing and configuring the guest operating systems. In one embodiment, the control operating system 165 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 161 executes the control operating system 165 within a virtual machine 166 created by the hypervisor 161. In still another embodiment, the control operating system 165 executes in a virtual machine 166 that is authorized to directly access physical resources on the computing device 100. In some embodiments, a control operating system 165a on a computing device 100a may exchange data with a control operating system 165b on a computing device 100b, via communications between a hypervisor 161a and a hypervisor 161b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 165 executes in a virtual machine 166 that is authorized to interact with at least one guest operating system 171. In another embodiment, a guest operating system 171 communicates with the control operating system 165 via the hypervisor 161 in order to request access to a disk or a network. In still another embodiment, the guest operating system 171 and the control operating system 165 may communicate via a communication channel established by the hypervisor 161, such as, for example, via a plurality of shared memory pages made available by the hypervisor 161.

In some embodiments, the control operating system 165 includes a network back-end driver for communicating directly with networking hardware provided by the computing device 100. In one of these embodiments, the network back-end driver processes at least one virtual machine request from at least one guest operating system 171. In other embodiments, the control operating system 165 includes a block back-end driver for communicating with a storage element on the computing device 100. In one of these embodiments, the block back-end driver reads and writes data from the storage element based upon at least one request received from a guest operating system 171.

In one embodiment, the control operating system 165 includes a tools stack 164. In another embodiment, a tools stack 164 provides functionality for interacting with the hypervisor 161, communicating with other control operating systems 165 (for example, on a second computing device 100b), or managing virtual machines 166b, 166c on the computing device 100. In another embodiment, the tools stack 164 includes customized applications for providing improved management functionality to an administrator of a virtual machine farm. In some embodiments, at least one of the tools stack 164 and the control operating system 165 include a management API that provides an interface for remotely configuring and controlling virtual machines 166 running on a computing device 100. In other embodiments, the control operating system 165 communicates with the hypervisor 161 through the tools stack 164.

In one embodiment, the hypervisor 161 executes a guest operating system 171 within a virtual machine 166 created by the hypervisor 161. In another embodiment, the guest operating system 171 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 171, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 161; in such an embodiment, the driver is typically aware that it executes within a virtualized environment.

In another embodiment, the guest operating system 171, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 165, as described above.

Figure 2:
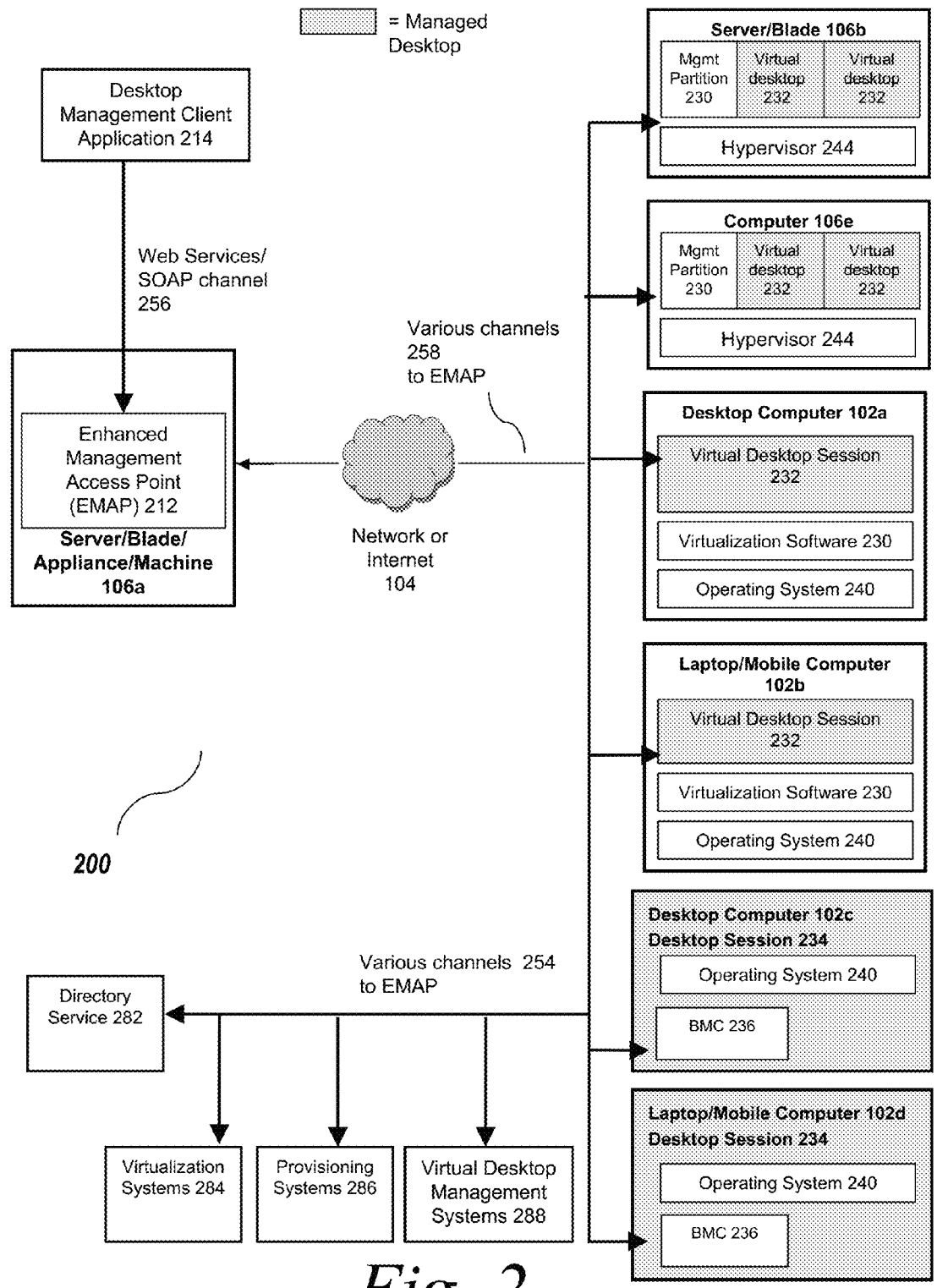
FIG. 2 is a block diagram depicting an embodiment of a system for providing unified management of desktop sessions.

Referring now to FIG. 2, a block diagram depicts an embodiment of a system 200 for providing active management of sessions. In brief overview, the system includes an enhanced management access point (EMAP) 212 in communication with a desktop management client application 214 and one or more of: a directory service 282, a virtualization system 284, a provisioning system 286 and a virtual desktop management system 288, over one or more networks 104. The system 200 also includes one or more computers 102 and servers 106, each computer 102 or server 106 supporting one or more user sessions 232, 234. In one embodiment, the EMAP 212 provides unified management of servers 106, computers 102 and user sessions 232, 234. In another embodiment, the EMAP 212 communicates with each of the computers 102, servers 106 and user sessions 232, 234 via a plurality of channels 258 in the network 104. In still another embodiment, the one or more user sessions 232, 234 may be provided or managed by one or more of the directory service 282, the virtualization system 284, the provisioning system 286 and the virtual desktop management system 288 via a plurality of channels 254. In yet another embodiment, the EMAP 212 may provide the unified management functions in operation with one or more of the directory service 282, the virtualization system 284, the provisioning system 286 and the virtual desktop management system 288.

Referring now to FIG. 2, and in one embodiment, the EMAP 212 can provide management functionality including, but not limited to: 1) discovery of and/or monitoring a plurality of servers 106, computers 102, appliances, server farms, data centers, hypervisors 244, directory services 282, virtualization systems 284, provisioning systems 286, virtual desktop management systems 288, virtual machines and/or desktop sessions (hereafter generally referred to as "managed entities", "managed entity" or "managed system"); 2) determining a level of activity or state of each of the managed entity; 3) tracking or receiving a notification of a migration of a session (which may be hosted by a managed entity) from a first machine to a second machine; and 4) sending instructions to modify the migrated user session from a first level of activity to a second level of activity.

As used herein, the terms "manage", "management" and any derivative terms may be associated with, or refer to, any of the functionalities, features and services provided by or provided in conjunction with the EMAP 212.

In some embodiments, an EMAP 212 functions as a centralized management point for monitoring or modifying a property or activity on a managed entity or system. In one of these embodiments, an EMAP 212 is responsible for the operation of an activity of a managed entity or system. In another of these embodiments, an EMAP 212 facilitates the operation of an activity of a managed entity or system. In still another of these embodiments, an EMAP 212 facilitates a change in a property, state or characteristic of a managed entity or system. In still even another of these embodiments, an EMAP 212 functions as an interface for affecting an operation or change in a managed entity or system. In yet another of these embodiments, an EMAP 212 performs an activity for a managed entity or system.

In some embodiments, an EMAP 212 monitors a plurality of managed entities via a discovery process. A discovery process may include one or more communications with one or more network components. In one embodiment, discovery of a managed entity occur via a broadcast and/or polling message transmitted by the EMAP 212 to the network. In another embodiment, a managed entity sends a message to the EMAP 212. In still another embodiment, a MAP of a managed entity, such as a hypervisor, a virtualization system 284, a virtual desktop management system 288 or a provisioning system 286, sends a message to the EMAP 212. In yet another embodiment, a management controller 236 or a service processor of a managed entity sends a message to the EMAP 212. In still even another embodiment, a EMAP 212 discovers an entity to manage by accessing a directory service 282. In some embodiments, the discovery process includes determining a location of the managed entity, for example, the server blade 106 on which a desktop session is hosted. In some of these embodiments, the discovery process includes determining a location of an associated MAP, management controller 236 or service processor of the managed entity.

In one embodiment, the EMAP 212 provides machine power control (MPC) functions for one or more managed entities. For example, MPC functions can include controls for powering off/on a server 106 and changing the power or activity level of a server 106, for example, placing a server 106 into standby mode. In another embodiment, the EMAP 212 provides baseboard management controller (BMC) functions for one or more managed entities. In still another embodiment, the EMAP 212 is referred to as a virtual baseboard management controller (a "vBMC" or a "virtual BMC"). In still even another embodiment, the EMAP 212 provides management access point (MAP) functions for one or more managed entities, for example, MAP functions as defined by the Distributed Management Task Force (DMTF), Inc. In yet another embodiment, an EMAP 212 may perform inventory query operations on a managed entity, a server farm, a data center, or any homogeneous or heterogeneous managed system. For example, an EMAP 212 may determine a number of operational machines in a server farm, or an application inventory in a desktop session.

In one embodiment, the EMAP 212 executes on a server 106 or an appliance. The server 106 or appliance may incorporate one or more features of any embodiment of the computing device 100 described above in connection with FIGS. 1B-1E. An appliance may be any type of network appliance, such as appliances manufactured by Citrix Systems, Inc., of Ft. Lauderdale, Fla. In another embodiment, the EMAP 212 may execute on, or incorporate functionality from one or more servers 106 and/or appliances in the network 104. In still another embodiment, the EMAP 212 may comprise hardware, or a combination of hardware and software, to provide the functionality described herein. In yet another embodiment, the EMAP 212 may execute on a virtual machine provided by a hypervisor executing on a server 106. In still even another embodiment, the EMAP 212 may reside in a virtual server executing in a server 106 or an appliance of the network 106.

In one embodiment, an EMAP 212 maintains a channel 258 to a managed entity. In another embodiment, the channel 258 may be dynamically maintained, disconnecting and re-connecting as a managed entity or the EMAP 212 migrates or relocates. In still another embodiment, the channel 258 provides access to a management interface. In still even another embodiment, a management interface may be a BMC or a service processor for a physical machine 102, 106. In yet another embodiment, a management interface may be a MAP to a managed entity.

In one embodiment, the EMAP 212 may have access to a management interface provided by or included with virtualization software for providing a virtual desktop session 232. In another embodiment, the EMAP 212 may have access to a management interface provided by a hypervisor 244. In still another embodiment, the EMAP 212 may have access to a management interface provided by a virtualization system 284. In still even another embodiment, the EMAP 212 may have access to a management interface provided by a provisioning system 286. In yet another embodiment, the EMAP 212 may have access to a management interface provided by a virtual desktop management system 288.

In one embodiment, an EMAP 212 determines if access to a managed entity is allowed. In another embodiment, the determination may include an authorization determination. In still another embodiment, an EMAP 212 ensures that a user account and access rights combination allows access to the managed entity. In yet another embodiment, an EMAP 212 determines that a managed entity is in a state where operation can be initiated. In one embodiment, an EMAP 212 may provide security and protection services. In another embodiment, an EMAP 212 may initiate system defense on the EMAP 212 or a managed entity to isolate the managed entity from a network attack, infection or corruption. For example, the EMAP 212 may turn off the network interface card (NIC) to isolate the managed entity. In still another embodiment, an EMAP 212 may initiate system protection on the EMAP 212 or a managed entity to isolate an infected or corrupted managed entity or EMAP 212 from infecting or corrupting other network elements. In yet another embodiment, an EMAP 212 may generate an alert to the managed system upon detection of an attack, infection or corruption in a portion of the managed system.

In one embodiment, the EMAP 212 may include a component that provides management functionality such as that described in the Desktop and mobile Architecture for System Hardware (DASH) standard. In another embodiment, the EMAP 212 may include a component that provides management functionality such as that described in the System Management Architecture for Server Hardware (SMASH) standard. In still another embodiment, the EMAP 212 may include a component that provides management functionality based on the simple object access protocol (SOAP)-based web service specification, web services (WS) management. In still even another embodiment, the EMAP 212 may include a component that provides management functionality providing MPC features. In yet another embodiment, the EMAP 212 may include a component that provides management functionality supporting a service processor or a BMC. For example, management functionality can be provided to support Active Management Technology (AMT) from Intel Corporation of Mountain View, Calif.

In one embodiment, an EMAP 212 provides management functions supporting managed entities comprising, but not limited to one or more of: virtual machines, virtual servers, virtual sessions and "physical" sessions executing on physical machines and/or other hardware infrastructure. In another embodiment, an EMAP 212 provides management functions for managed entities based in part on infrastructure supporting, but not limited to, the following standards: CIM, SMASH, DASH, AMT, Intelligent Platform Management Interface (IPMI), integrated Lights-Out (iLO) and WS-management In one embodiment, the EMAP 212 may provide functionality for out-of-band (OOB) management of servers 106, computers 102 or other types of physical and virtual machines. In another embodiment, the EMAP 212 may provide functionality for OOB management of user sessions 232, 234. In still another embodiment, user sessions may include any type and form of server sessions and desktop sessions. In yet another embodiment, user sessions may also be any type and form of virtual sessions, for example, a virtual desktop session 232.

In one embodiment, a resource provided within a server session (e.g. desktop session) may include, without limitation, a program, an application, a document, a file, a plurality of applications, a plurality of files, an executable program file, a second desktop environment, a computing environment, or other resource made available to a user of a client machine 102. The resource may be delivered to the server session via a plurality of access methods including, but not limited to, conventional installation directly on the client machine 102, delivery to the client machine 102 via a method for application streaming, delivery to the client machine 102 of output data generated by an execution of the resource on a third machine and communicated to the client machine 102 via a presentation layer protocol, delivery to client machine 102 of output data generated by an execution of the resource via a virtual machine executing on either the client machine 102 or a remote machine 106, or execution from a removable storage device connected to the local machine 102, such as a USB device.

In one embodiment, an EMAP 212 provides management functionalities for both in-band and out-of-band management support. In another embodiment, an EMAP 212 provides a single standards-based solution for one or more in-band or out-of-band managed systems. In still another embodiment, an EMAP 212 integrates both in-band and out-of-band management support, hiding the complexities of each under a single standards-based solution. In some embodiments, in-band management may include functionality supporting at least one of: common information model (CIM), SMASH, DASH, WS-management and AMT. In some embodiments, out-of-band management may include functionality other than CIM, SMASH, DASH and AMT functionality. In one of these embodiments, out-of-band management includes support for virtual machines, virtual servers and/or virtual sessions. In another of these embodiments, out-of-band management includes management support across a range of proprietary, vendor-specific and standard-based BMCs and service processors.

In one embodiment, the EMAP 212 provides management functionalities for virtualized systems, such as virtual machines, virtual servers and/or virtual sessions. In another embodiment, the EMAP 212 manages virtual desktop sessions. In still another embodiment, the managed virtual sessions (e.g., virtual desktop sessions) may be in an active, inactive, hibernating, standby or suspended state or level of activity. In some embodiments, the EMAP 212 manages a managed entity directly. In other embodiments, the EMAP 212 manages a managed entity indirectly. For example, in some of these embodiments, the EMAP 212 manages a virtual session via a MAP, such as a hypervisor, a virtualization system 284, a virtual desktop management system 288 or a provisioning system 286. In another of these embodiments, EMAP 212 management may be applied directly or indirectly to virtual machines, virtual servers and/or virtual sessions.

In one embodiment, a managed entity, such as a virtual desktop, may be in any state or level of activity. In another embodiment, a managed entity may be suspended, powered off, or not yet created and/or started (e.g., represented by a collection of stored settings, or a default disk image for configuring or initiating a new session). In still another embodiment, the level of activity of a managed entity may be active, inactive, hibernating or standby. In these embodiments, the EMAP 212 may manage a transition of a managed entity from any one state or level of activity to another state or level of activity.

In one embodiment, an EMAP 212 may manage a virtual managed entity in substantially the same manner as a physical managed entity. In another embodiment, an EMAP 212 may manage a virtual managed entity in a different manner from a physical managed entity. In still another embodiment, an EMAP 212 may emulate a virtual managed entity as a physical managed entity. For example, an EMAP 212 may emulate a virtual machine (with a virtual BMC) as a physical machine 102, 106 (with a physical BMC). In another example, an EMAP 212 may emulate a virtual desktop session 232 as a physical desktop session 234. In some embodiments, an administrator or management process accessing a managed entity through an EMAP 212 may or may not be able to differentiate between a virtual managed entity and a physical managed entity.

In one embodiment, the EMAP 212 provides functionality substantially similar to that provided by a management access point (MAP). In some embodiments, a MAP is a network-accessible service for managing a managed system or managed entity. In another embodiment, the EMAP 212 may function as an MAP to a managed entity. In still another embodiment, a management process, a management processor, a service process, or a service processor may monitor or manage an entity through the EMAP 212. In yet another embodiment, the EMAP 212 may function as a centralized MAP to a plurality of managed entities. In still even another embodiment, the EMAP 212 may provide, share or receive commands, software or other functionality in communication with a MAP of a managed entity to function as an extension of the MAP. In yet another embodiment, the EMAP 212 may include one or more instantiations of a MAP.

In one embodiment, the EMAP 212 provides functionality substantially similar to that provided by a baseboard management controller (BMC). In another embodiment, the EMAP 212 may function as an externalized BMC to a managed entity, i.e., the EMAP 212 reside at a location apart from the managed entity. In still another embodiment, a high order management process, such as a desktop management client application 214, may monitor or manage an entity as if the EMAP 212 is a BMC associated with the entity. In yet another embodiment, the EMAP 212 may function as an externalized BMC to a plurality of managed entities. In still even another embodiment, the EMAP 212 may provide, share or receive commands, software or other functionality in communication with a BMC of a managed entity to function as an extension of the BMC.

In one embodiment, an EMAP 212 may provide a set of management functions even if a managed entity is inaccessible, e.g., due to inactivity or network failure. In another embodiment, the EMAP 212 may communicate with one or more dependent management systems or MAPs, such as a hypervisor 244, virtualization system 284, a provisioning system 286, a virtual desktop management system 288, or a directory service 282, to provide the set of management functions. In still another embodiment, the EMAP 212 may access cached results (e.g., from an associated MAP) in providing the set of management functions. For example, if the desktop management client application 214 requests a software inventory for a particular virtual desktop session 232 hosted on a laptop 102 that is currently powered off, the EMAP 212 may communicate with the session's virtual desktop management system 288 for information on the session's software inventory. In some embodiments, the EMAP 212 caches information related to a managed entity, for example inventory data, configurations and settings. In one of these embodiments, a mobile device including one or more managed entities may include virtual sessions or physical sessions. By way of illustration, the mobile device may be a laptop. The mobile device's BMC or hypervisor can be a MAP for these managed entities. Since the EMAP 212 may sometimes fail to access the mobile device (and the MAP), an EMAP 212 may cache data related to the managed entities for use.

In one embodiment, an EMAP 212 may incorporate at least some features of a dependent management system, or at least some components of a managed entity, to emulate a hardware BMC, service processor, or a MAP for a managed entity. In another embodiment, an EMAP 212 may use a hypervisor to emulate a BMC for a virtual desktop session 232. In still another embodiment, an EMAP 212 may use a single physical BMC of a server 106 to emulate corresponding BMCs for a plurality of virtual machines executing on the server 106.

In some embodiments, an EMAP 212 may relocate or transition from one server 106 or appliance to another. In one of these embodiments, the EMAP 212 may reside in a virtual machine migrating from a first server 106 to a second server 106'. For example, and in one embodiment, migration of a virtual machine may involve cloning or mirroring the virtual machine in a different server. In another of these embodiments, functionality or services provided by one EMAP 212 on a first server 106 may be transferred to another EMAP 212 on a second server 106'. For example, and in one embodiment, one or more redundant EMAP 212 servers may be available to provide EMAP 212 functionality in case of server failure. In some embodiments, an EMAP 212 may remain statically located allowing for a single, consistent and/or uninterrupted communication channel with the desktop management client application 214 or other management processes.

A plurality of EMAPs 212 may be configured to manage a plurality of entities over one or more networks 104. In one embodiment, one or more of a plurality of EMAPs may be dynamically assigned to manage a subset of a plurality of entities. In another embodiment, a hierarchy of EMAPs may be configured to manage a plurality of entities. In still another embodiment, a hierarchy of EMAPs may provide different sets of management functionalities, for example, in support of standards such as DASH and SMASH. In yet another embodiment, a plurality of EMAPs may be grouped or integrated into one unit to provide unified management for in-band and out-of-band management capabilities.

In one embodiment, an EMAP 212 communicates with the DMCA 214 via a channel 256, such as a web services (WS) or SOAP channel. In another embodiment, the EMAP 212 and the DMCA 214 are part of a system provided by a machine 106. In still another embodiment, the EMAP 212 provides the DMCA 214 for execution on the same server 106, appliance 200 or client computer 102, or for execution on another machine. In still even another embodiment, a DMCA 214 may provide MPC functionalities, for example, in-band support. In yet another embodiment, a DMCA 214 may interface with machines 106,102 to provide MPC directives.

In one embodiment, the DMCA 214 directs MPC activity via the EMAP 212. In another embodiment, the EMAP 212 provides both in-band and out-of-band management support to the DMCA 214. In still another embodiment, the EMAP 212 provides a unified interface to the DMCA 214 for both in-band and out-of-band management support. In yet another embodiment, the DMCA 214 enables a user or another system to direct the management activities of servers 106, computers 102 and/or user sessions. In still even another embodiment, the DMCA 214 enables a user or another system to monitor the management activities of servers 106, computers 102 and/or user sessions. In one embodiment, the DMCA 214 may not have to differentiate between a virtual machine and a physical machine 106, 102 when monitoring or directing activity via the EMAP 212. In another embodiment, the DMCA 214 may not be aware whether the managed entity is a virtual machine or a physical machine 106, 102 when monitoring or directing activity via the EMAP 212.

In one embodiment, a workflow solution, such as CITRIX WORKFLOW STUDIO, may be used as part of the DMCA 214 to direct the EMAP 212 in the management of a plurality of servers 106. In another embodiment, a system management tool, such as MICROSOFT SYSTEM CENTER, may be used as part of the DMCA 214 to direct the EMAP 212 in the management of a plurality of servers 106. For example, Wake-on-LAN activity can be controlled within an interface provided by a workflow solution. The workflow solution can coordinate MPC activities across a plurality of heterogeneous machines and virtual machines by providing custom interfaces with each type of machine. The workflow solution can also coordinate MPC activities across a plurality of heterogeneous machines and virtual machines by providing a uniform interface for the EMAP 212 across different types of machine. In yet another embodiment, a workflow solution manages the activities of the EMAP 212.

Referring still to FIG. 2, and in further detail, the EMAP 212 manages a plurality of servers 106 and computers 102. In one embodiment, each of the plurality of servers 106 and computers 102 may incorporate one or more features of the embodiments of the computing device 100 described above in connection with FIGS. 1B-1E. In another embodiment, the plurality of servers 106 may include one or more server blades. In still another embodiment, the plurality of computers 102 may include one or more desktop computers, laptops and mobile computers. In one embodiment, an Intelligent Platform Management Interface (IPMI) may be implemented in a server's service processor or baseboard management system to allow an EMAP 212 to activate a server 106 from a low-power standby mode. In another embodiment, an IPMI may be implemented in a computer's service processor or baseboard management system to allow an EMAP 212 to support a range of management functions, for example, to activate a computer 102 from low-power standby mode. In some embodiments, a user, such as an administrator, can modify a level of activity on a managed entity, for example via IPMI communications from an EMAP 212 to a BMC of the managed entity.

In one embodiment, each computer may provide one or more user sessions, such as a desktop session 234, executing on the physical machine of the computer 102. In another embodiment, each computer may include virtualization software 230 for providing one or more virtual sessions, such as a virtual desktop session, delivered from one or more of a virtualization system 284, a virtual desktop management system 288 and a provisioning system 286. In still another embodiment, each computer may include one or more operating systems 240 as described above in connection with FIGS. 1B-1E. The operating system supports the virtualization software 230 in providing the one or more virtual sessions.

In one embodiment, each computer 102 and/or server 106 includes a management controller 236, such as a baseboard management controller (BMC). In another embodiment, a management controller 236 is provided as a portion of one or more chips, such as a chipset. In another embodiment, a management controller 236 is provided as a portion of one or more circuit boards. In still another embodiment, a management controller 236 is at least partially powered up and operational when the associated computer 102 or server 106 is a managed entity. For example, the management controller 236 may remain powered up and can communicate with the EMAP 212 when the rest of the host computer 102 is powered down or in low-power mode. In yet another embodiment, a management controller 236 may support some or all active management technology (AMT) features.

In one embodiment, a management controller 236 provides functionality substantially the same as that provided by a service processor. In another embodiment, a management controller 236 may include any form of hardware or combination of hardware and software. In some embodiments, a management controller 236 or a service processor may reside in another device. For example and in one embodiment, a server blade 106 may be connected to a chassis and managed via a management controller 236 in the chassis. In another embodiment, the management controller 236 in the chassis may manage one or more server blades 106 connected to the chassis. In one embodiment, a management controller 236 can modify a level of activity of the host computer 102 or host server 106. In another embodiment, a management controller 236 can initiate and perform operations on the operating system 240. In still another embodiment, a management controller 236 can, in communication with the operating system 240, modify a level of activity of the host computer 102 or host server 106.

In one embodiment, a management controller 236 can, in communication with the operating system 240, modify a level of activity associated with a user session executing on the host computer 102 or host server 106. In another embodiment, the operating system 240 can modify a level of usage of resources on the computer 102 or host server 106 supporting the user session to modify a level of activity associated with the user session. In still another embodiment, the resources may include at least one of memory, processor, communications input/output bandwidth and disk input/output bandwidth.

In one embodiment, each server 106 may operate substantially the same as one or more embodiments of the computers 102 described above in providing one or more user sessions. These user sessions may include virtual desktop sessions 232 and physical desktop sessions 234. In another embodiment, each server 106 may execute a hypervisor 244. In still another embodiment, each hypervisor may provide one or more virtual sessions, such as a virtual desktop session 234. In yet another embodiment, each server 106 may include a management partition 230 to partition and/or provide resources for supporting the one or more virtual sessions. In some embodiments, the hypervisors 244 on the server 106b, 106e is sometimes referred as a "type 1" or bare metal hypervisor, as described above in connection with FIG. 1F.

In another embodiment, each computer or laptop 102a, 102b, 106e may operate substantially the same as one or more embodiments of the servers 106b described above in providing one or more user sessions. For example and in one embodiment, a computer or laptop 102a, 102b may execute a hypervisor 244. In another embodiment, the hypervisor 244 may provide one or more virtual sessions, such as a virtual desktop session 234. In some embodiments, the hypervisor 244 on the computer or laptop 102a, 102b is sometimes referred as a type 2 hypervisor.

In some embodiments, a virtual session 232 is provided or provisioned by at least one of a hypervisor, a virtualization system 284, a virtual desktop management system 288 and a provisioning system 286. In one embodiment, a virtual session 232 is a remote session provided to a client device (e.g., a laptop computer 102) by an appliance or server. In another embodiment, a virtual session 232 executes remotely on an appliance or server 106 and is delivered to a computer 102 or second server 106'. In still another embodiment, a virtual session 232 is provided via a hypervisor 244 from a virtual machine environment. In yet another embodiment, the virtual session 232 resides on the same server 106 as the hypervisor 244.

In one embodiment, a virtual session 232 may be delivered onto a computer 102 or server 106 via virtualization software 230. In another embodiment, a virtual desktop session 232 provides an interface to a user substantially similar to a desktop session executing on the computer 102 of the user. In still another embodiment, a desktop session, virtual or otherwise, provides at least one application or file to the user. In yet another embodiment, a desktop session includes a graphical interface or environment presented on a display for a user to access at least application or file.

In one embodiment, a virtual desktop session 232 may be downloaded to a physical machine 102, 106. In another embodiment, the downloaded virtual desktop session 232 may continue to operate on the physical machine 102, 106 after disconnection from the EMAP 212 or other management processes. In still another embodiment, while disconnected, the EMAP 212 may provide limited management functionality by accessing cache results associated with the virtual desktop session 232. In still even another embodiment, when reconnected, the EMAP 212 resumes management of the virtual desktop session 232. In yet even another embodiment, the EMAP 212 may resume management of the virtual desktop session 232 through a discovery process or upon receipt of a notification regarding the reconnection.

In one embodiment, a virtual desktop session may be mobile or portable. In another embodiment, a virtual desktop session may migrate from one physical machine 102, 106 to another physical machine 102', 106'. In still another embodiment, a virtual desktop session may migrate between data centers across a network 104. In yet another embodiment, the mobility of a virtual desktop session may be supported at least in part by the DASH specification or other desktop management protocol or specification. In still even another embodiment, a physical machine hosting a virtual desktop session may be mobile (e.g., a laptop) and may physically relocate to and connect to the network 104 from any location.

In one embodiment, a virtual desktop session may migrate between a plurality of hypervisors. For example, and in one embodiment, products such as CITRIX XENMOTION may include features to support virtual desktop session migration. In another embodiment, a virtual desktop session may migrate between a plurality of hypervisors in a plurality of server clusters, data centers, or sites. In still another embodiment, a virtual desktop session may migrate from a hypervisor 244 (e.g., running on a data center server 106) to a virtualization system 284 (e.g., running on a workstation or a mobile computer). In yet another embodiment, a virtual desktop session may migrate between virtualization systems on different desktop or mobile computers. In some embodiments, the migration may be seamless or substantially seamless. In one embodiment, the process for such migrations is referred as a virtual-to-virtual (V2V) process. In some embodiment, a managed entity may migrate from one type of hypervisor to another. For example and in one embodiment, a managed entity may migrate from a VMWARE hypervisor to a CITRIX XENSERVER hypervisor.

In some embodiments, a virtual desktop session may migrate between virtual platforms (e.g., a hypervisor or a virtual desktop management system) and physical platforms (e.g., a server, workstation or mobile computer). In one of these embodiments, the migration may use a physical-to-virtual (P2V) process. In another of these embodiments, the migration may use a virtual-to-physical (V2P) process.

Although discussed illustratively in the context of a virtual desktop session, one or more characteristics of the virtual desktop session described herein may apply to other types of virtual managed entities as well.

Referring again to FIG. 2, and in one embodiment, the system 200 includes one or more virtualization systems 284 in communication with the EMAP 212. In another embodiment, a virtualization system 284 may be a server 106 or an appliance providing a virtualized session, service or resource to a machine 102, 106'. In still another embodiment, a virtualization system 284 may include partitioning or apportioning hardware or software resources to provide the virtualized session, service or resource. In yet another embodiment, a virtualization system 284 may provide a virtual server, virtual machine or a virtual desktop session 232. In still even another embodiment, functionality for a virtualization system 284 may be provided by CITRIX XENSERVER and XEN HYPERVISOR products or other similar systems. In yet even another embodiment, a channel 254 may be established between an EMAP 212 and a virtualization system 284 to support a managed entity. In some embodiments, a virtualization system 284 may operate with virtualization software 230 to provide a virtualized session, service or resource.

In one embodiment, the system 200 includes one or more provisioning systems 286 in communication with the EMAP 212. In another embodiment, a provisioning system 286 may be a server 106 or an appliance providing a user session, service or resource to a remote machine 102, 106'. In yet another embodiment, a provisioning system 286 may provision a virtual server or a virtual desktop session 232. In still even another embodiment, a provisioning system 286 may be a CITRIX PROVISIONING SERVER or other similar systems. In yet even another embodiment, a channel 254 may be established between an EMAP 212 and a provisioning system 286 to provide management functions for a managed entity.

In one embodiment, the system 200 includes one or more virtual desktop management systems 288 in communication with the EMAP 212. In another embodiment, a virtual desktop management system 288 may include a server 106 or an appliance providing a remote or virtual desktop session to a machine 102, 106'. In yet another embodiment, a virtual desktop management system 288 may be a CITRIX XEN DESKTOP product or other similar systems. In yet even another embodiment, a channel 254 may be established between an EMAP 212 and a virtual desktop management system 288 to provide management functions for a managed virtual desktop session. In some embodiments, a virtual desktop management system 288 may operate with virtualization software 230 to provide a virtual desktop session 232.

In one embodiment, the system 200 includes one or more directory services 282 in communication with the EMAP 212. In another embodiment, a directory service 282 may include a server 106 and/or a database. In still another embodiment, a directory service 282 may be a MICROSOFT ACTIVE DIRECTORY. In yet another embodiment, a channel 254 may be established between an EMAP 212 and a directory service 282 to provide management functions for a managed virtual desktop session. In still even another embodiment, a directory service 282 supports one or more of the following features: managed entity tracking, location and access, protocol and versioning information, process logging, configuration data and systems settings, state and status data, and other cache results from managed entities.

Figure 3:
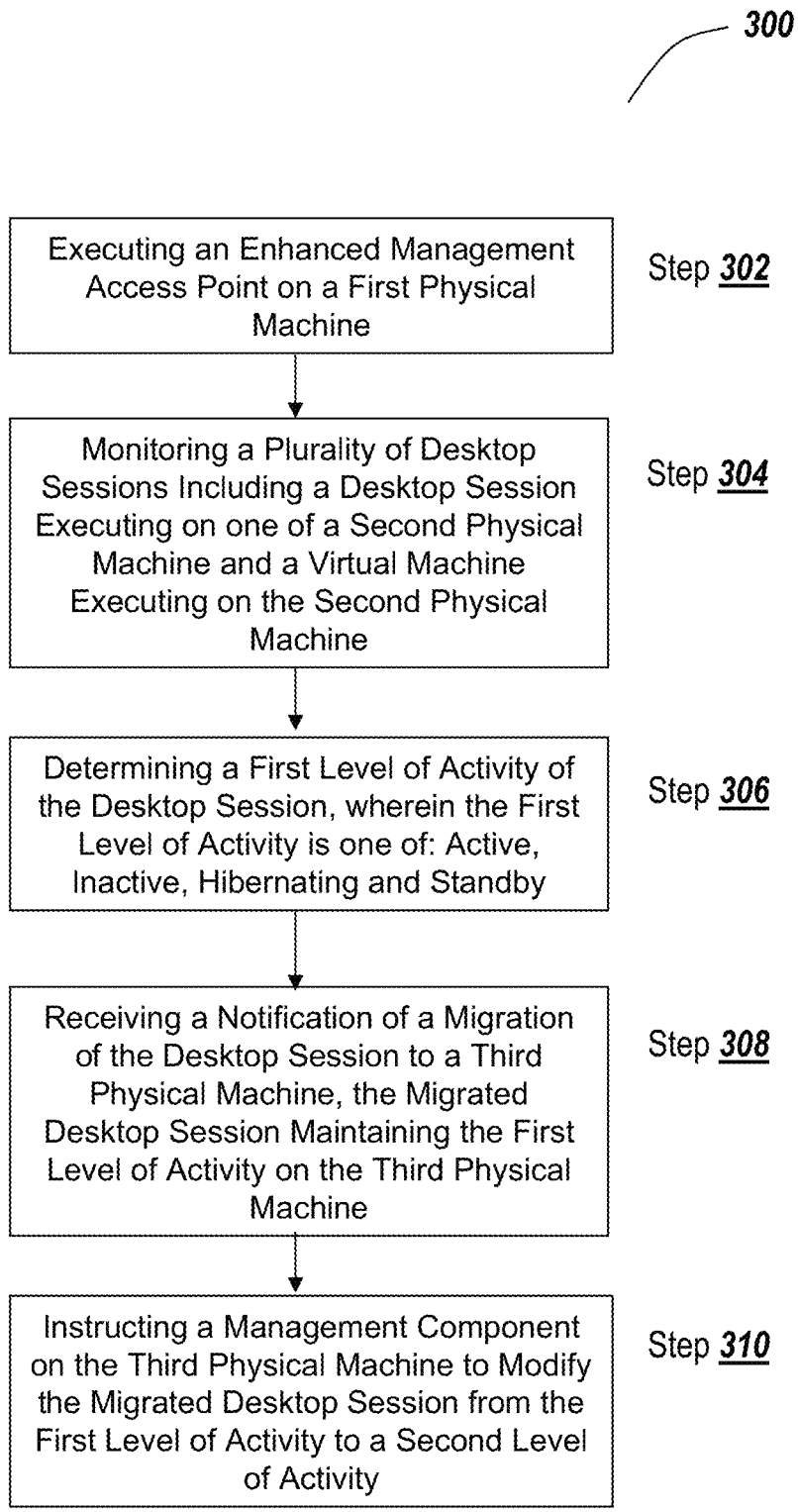
FIG. 3 is a flow diagram depicting one embodiment of a method for providing unified management of desktop sessions.

Referring now to FIG. 3, a flow diagram depicts one embodiment of the steps taken in a method 300 for using standards-based functionality to provide unified management for a plurality of remote desktop sessions by an enhanced management access point (EMAP). This unified management may be provided via out of band management communication. The method includes executing an enhanced management access point on a first physical machine (302). The method includes monitoring, by the enhanced management access point, a plurality of desktop sessions including a desktop session executing on one of a second physical machine and a virtual machine executing on the second physical machine (304). The desktop session can provide access to at least one application or file. The method includes determining, by the enhanced management access point, a first level of activity of the desktop session, wherein the first level of activity is one of: active, inactive, hibernating and standby (306). The method includes receiving, by the enhanced management access point, a notification of a migration of the desktop session to a third physical machine, the migrated desktop session maintaining the first level of activity on the third physical machine (308). The method includes instructing, by the enhanced management access point, a management component on the third physical machine to modify the migrated desktop session from the first level of activity to a second level of activity (310). The second level of activity can be one of: active, inactive, hibernating and standby.

Referring now to FIG. 3, and in greater detail, an EMAP 212 executes on a first physical machine (302). In one embodiment, the EMAP 212 executes on one or more physical machines in a network. In another embodiment, the EMAP 212 executes on one or more physical machines that are not managed by the EMAP 212. In yet another embodiment, the EMAP 212 executes on a machine the EMAP 212 manages.

In one embodiment, a desktop management client application 214 is in communication with the EMAP 212 executing on a first physical machine 106a. For example, the desktop management client application 214 may transmit commands to the EMAP 212. In another embodiment, the desktop management client application 214 executes on a second physical machine 106b. In still another embodiment, the desktop management client application 214 executes on the first physical machine 106a.

In one embodiment, the EMAP 212 determines the locations of a plurality of managed entities, e.g., via discovery. In another embodiment, the EMAP 212 monitors the locations of a plurality of managed entities. In still another embodiment, the EMAP 212 determines and monitors the location of the plurality of managed entities through a discovery process. In still even another embodiment, the EMAP 212 may determine the location of a managed entity via a directory service 282 or a directory such as MICROSOFT ACTIVE DIRECTORY. In yet another embodiment, the location of a managed entity may include any type and form of address or identifier such as an IP address, MAC address, domain address, site identifier, cluster identifier, server blade identifier, processing core identifier, virtual machine identifier and session identifier. In a further embodiment, the EMAP 212 may determine the location of a managed entity in communication with one or more of network elements, such as a virtualization system 284, a provisioning system 286, a virtual desktop management system 288, a server 106, a computer 102, a hypervisor 244, a virtual machine, a desktop management client application 214, a management access point, or a baseboard management controller 236.

In one embodiment, the EMAP 212 determines the locations of a plurality of mobile or portable managed entities (e.g., laptops and virtual machines). In another embodiment, the EMAP 212 monitors the locations of a plurality of mobile or portable managed entities. In still another embodiment, the EMAP 212 tracks the location of one or more managed entities migrating from one location to another. In yet another embodiment, an EMAP 212 can manage a plurality of geographically dispersed managed entities.

In some embodiments, an EMAP 212 can track and manage entities migrating between virtual platforms (e.g., a hypervisor or a virtual desktop management system). In other embodiments, an EMAP 212 can track and manage entities migrating between virtual platforms and physical platforms (e.g., a server, workstation or mobile computer). In one of these embodiments, the migration may use a physical-to-virtual (P2V) method. For example, a server session executing on a physical machine 102, 106, may be replaced by a virtual server session. In another of these embodiments, the migration may use a virtual-to-physical (V2P) method. For example, a virtual desktop session can be transitioned to a physical desktop session executing on a physical machine 102, 106.

In one embodiment, an EMAP 212 monitors or tracks the location of a managed entity by polling or querying one or more of the associated servers 106, computers 102, hypervisors 244, virtualization systems 284, provisioning systems 286, virtual desktop management systems 288, virtual machines, desktop management clients 214, management access points, or baseboard management controllers 236. In another embodiment, the polling or querying process may involve a plurality of stages, for example, the EMAP 212 may transmit a query to a server 106, which in turn transmits a query to a hypervisor. The hypervisor may respond to the server 106, which then responds to the EMAP.

In one embodiment, the EMAP 212 identifies the virtualization system 284, provisioning system 286, virtual desktop management system 288 and/or virtual machine providing a user session. In another embodiment, the EMAP 212 identifies the hypervisor 244 providing a virtual machine. In still another embodiment, the location of a user session and/or virtual machine may include the location of the physical machine on which the user session and/or virtual machine is executing. In still another embodiment, the location of a user session may include an identification of the virtual machine, hypervisor 244, virtualization system 284, provisioning system 286, virtual desktop management system 288 and/or virtual machine providing the user session. In yet another embodiment, the location of a virtual machine may be, or include, an identification of the hypervisor 244, virtualization system 284, provisioning system 286, virtual desktop management system 288 and/or virtual machine providing the virtual machine.

The EMAP 212 monitors a plurality of desktop sessions including a desktop session executing on one of a second physical machine and a virtual machine executing on the second physical machine (304). In one embodiment, the desktop session can provide access to at least one application or file. In another embodiment, the EMAP 212 monitors a plurality of desktop sessions via a discovery process. In another embodiment, the EMAP 212 monitors a plurality of desktop sessions by communicating with the second physical machine or the virtual machine providing the desktop session. In still another embodiment, the desktop session may be a virtual desktop session 232 provided by a virtual machine executing on the first physical machine. In yet another embodiment, the desktop session may be a physical desktop session 234 executing on the first physical machine.

In one embodiment, the EMAP 212 monitors the plurality of desktop sessions by communicating with at least one of: a hypervisor 244, virtualization software 230, a virtualization system 284, a virtual desktop management system 288, a directory service 282 and a provisioning system 286, any of which may provide access to the desktop session. In another embodiment, the EMAP 212 monitors the plurality of desktop sessions via a plurality of channels 258, 254. In still another embodiment, the EMAP 212 monitors the plurality of desktop sessions via a polling or querying process. In yet another embodiment, the EMAP 212 monitors the plurality of desktop sessions via polling or querying at least one physical machine providing the plurality of desktop sessions. In still even another embodiment, the EMAP 212 monitors the plurality of desktop sessions by communicating with one or more BMCs 236, service processors, MAPs, and virtualization software 230 associated with the plurality of desktop sessions.

In one embodiment, the EMAP 212 monitors the plurality of desktop sessions using functionality specified by one or more protocols and standards, including without limitation, SMASH, DASH, WS-management and CIM. In another embodiment, the EMAP 212 monitors the plurality of desktop sessions using in-band and out-of-band management functions. In still another embodiment, the EMAP 212 monitors the plurality of desktop sessions by requesting or receiving information transmitted from collection agents executing on, or associated with, the plurality of desktop sessions. In yet another embodiment, the desktop management client application 214 monitors the plurality of desktop sessions via the EMAP.

In one embodiment, the EMAP 212 monitors a plurality of server sessions including a server session executing on one of a second physical machine and a virtual machine executing on the second physical machine. In another embodiment, the server session provides access to at least one application or file. In still another embodiment, the EMAP 212 monitors the plurality of server sessions using one or more of the processes, communications, protocols, channels, standards and management functions discussed above in connection with step 304 for monitoring desktop sessions. In yet another embodiment, monitoring server sessions is substantially similar to monitoring desktop sessions.

The EMAP 212 determines a first level of activity of the desktop session (306). In one embodiment, the first level of activity is one of: active, inactive, hibernating and standby. In another embodiment, the EMAP 212 can determine a first level of activity of the desktop session using one or more of the processes, communications, protocols, channels, standards and management functions discussed above in connection with step 304. In still another embodiment, the EMAP 212 transmits information on the first level of activity of the desktop session to the desktop management client application 214.

In one embodiment, the EMAP 212 determines a first level of activity of the desktop session by evaluating or processing information received or collected from the desktop session. In another embodiment, the EMAP 212 send a command, script or process to the managed entity or an associated dependent management system, to collect or determine the first level of activity of the desktop session on behalf of the EMAP 212. In still another embodiment, the EMAP 212 determines a first level of activity of the desktop session by accessing cached results or a directory service 282. In yet another embodiment, the EMAP 212 may access cached results, a directory service 282, or other dependent management systems upon determining that the desktop session is inaccessible.

In one embodiment, the EMAP 212 identifies the second physical machine providing the desktop session, the desktop session executing on the second physical machine. In another embodiment, the EMAP 212 identifies the second physical machine providing the virtual desktop session, the virtual desktop session provided by a virtual machine or hypervisor 244 executing on the second physical machine. In still another embodiment, the EMAP 212 identifies the second physical machine using one or more of the processes, communications, protocols, channels, standards and management functions discussed above in connection with steps 304 and 306. In yet another embodiment, the desktop management client application 214 identifies the second physical machine via the EMAP 212.

The EMAP 212 receives a notification of a migration of the desktop session to a third physical machine, the migrated desktop session maintaining the first level of activity on the third physical machine (308). In some embodiments, the EMAP 212 receives a notification of a migration of the desktop session via a discovery process. In one embodiment, the EMAP 212 can receive a notification of a migration of the desktop session using one or more of the processes, communications, protocols, channels, standards and management functions discussed above in connection with steps 304 and 306. In another embodiment, for example, the EMAP 212 receives a notification of a migration of the desktop session by polling or querying a management process for the notification of the migration of the desktop session. In yet another embodiment, the management process is provided by at least one of: a hypervisor 244, virtualization software 230, a virtualization system 286, a virtual desktop management system 288, a provisioning system 286, and a directory service 282, any of which may provide the desktop session to a user. In some embodiments, the discovery process includes determining a new location of the desktop session. In one of these embodiments, the notification of the migration includes an identification of the new location. In another of these embodiments, the EMAP 212 requests for the new location of the desktop session or determines the new location by communicating with an associated MAP, management controller 236 or service processor.

In one embodiment, the EMAP 212 can determine a migration of the desktop session using one or more of the processes, communications, protocols, channels, standards and management functions discussed above in connection with steps 304 and 306. In another embodiment, the EMAP 212 may initiate the migration of the desktop session. In still another embodiment, the EMAP 212 may initiate a migration of the desktop session via a virtual-to-physical (V2P) process. In yet another embodiment, the EMAP 212 initiates a migration of a virtual desktop session 232 provided by a virtual machine or hypervisor 244 executing on the second physical machine, to a physical desktop session 234 executing on the third physical machine. In still even another embodiment, the EMAP 212 may initiate a migration of the desktop session executing on the second physical machine to another physical desktop session executing on the third physical machine.

In one embodiment, the EMAP 212 determines the third physical machine executing the migrated desktop session. In another embodiment, the third physical machine may not be accessible to the EMAP 212 because it is not managed by the EMAP 212. In still another embodiment, if the EMAP 212 cannot access the third physical machine, the EMAP 212 may cease to manage the associated desktop session. In yet another embodiment, the EMAP 212 may try to register, process or include the third physical machine for management by the EMAP.

The EMAP 212 instructs a management component on the third physical machine to modify the migrated desktop session from the first level of activity to a second level of activity (310). In one embodiment, the second level of activity can be one of: active, inactive, hibernating and standby. In another embodiment, the second level of activity differs from the first level of activity. In still another embodiment, the second level of activity is the same or substantially similar to the first level of activity. In yet another embodiment, the EMAP 212 does not initiate or affect a change in the level of activity of the migrated desktop session. In still even another embodiment, the migrated desktop session is a physical desktop session executing on the third physical machine.

In one embodiment, the EMAP 212 instructs the management component on the third physical machine using one or more of the processes, communications, protocols, channels, standards and management functions discussed above in connection with steps 304 and 306. For example, in another embodiment, the EMAP 212 instructs the management component on the third physical machine using DASH specifications. In still another embodiment, the EMAP 212 instructs the management component on the third physical machine using SMASH specifications. In yet another embodiment, the EMAP 212 instructs the management component via at least one of a provisioning system and a directory service, either of which may provide information associated with the migrated desktop session.

In one embodiment, the EMAP 212 may direct a command to any machine (e.g., server 106 or computer 102) to control the power or activity level of that machine. In another embodiment, the EMAP 212 may direct a command to a power management agent residing in the machine to control the power or activity level of the machine. For example, and in one embodiment, the power management agent may communicate with the OS of a server 106 to control the power level of the server 106. A power management agent can be, for example, a BMC, or a process executing on the BMC. In still another embodiment, the EMAP 212 may direct a command to a management controller, such as a baseboard management controller (BMC) residing in the machine, to control the power or activity level of the machine. In yet another embodiment, Wake-on-LAN (WOL) controls 712 may be used to activate a server 106 or computer 102 from low-power standby mode.

In one embodiment, an EMAP 212 can process or generate one or more commands, messages, and operations with respect to a managed entity. In another embodiment, an EMAP 212 checks or ensures that a command transmitted to or received from a managed entity is syntactically correct. In still another embodiment, an EMAP 212 determines if an operation or property modification is properly formed and conveyed for a particular managed entity. In yet another embodiment, an EMAP 212 determines if an operation or property modification is a valid request. In still even another embodiment, an EMAP 212 determines and/or ensures that any of the above requests takes place as indicated. In yet even another embodiment, an EMAP 212 can translate communications between various protocols in managing a plurality of homogeneous managed entities. For example, the EMAP 212 can translate communications between a management access point (MAP), service processors and BMCs of different machine types or from various manufacturers. In some embodiments, the EMAP 212 can translate communications between various protocols in managing a plurality of virtual and physical managed entities.

In one embodiment, an EMAP 212 validates or checks that communications with a managed entity complies with one or more predetermined protocols or standards. In another embodiment, the EMAP 212 may delegate an operation to the managed entity, another network element, or a component of the managed entity. In still another embodiment, an EMAP 212 may send a command or script to a managed entity to initiate a process, job or operation (hereafter generally referred to as "operation(s)"). In yet another embodiment, an EMAP 212 may track or manipulate one or more operations, including completing, canceling, removing, or logging operations. In one embodiment, an EMAP 212 maintains the session context with a managed entity. In another embodiment, an EMAP 212 maintains any session-related information, such as current default target with a managed entity. In still another embodiment, an EMAP 212 maintains one or more option settings, such as language, locale, or output format, with a managed entity.

In one embodiment, an EMAP 212 determines if a particular managed entity is within the scope of management of the EMAP 212. In another embodiment, an EMAP 212 determines if a particular managed entity supports particular operations. In still another embodiment, an EMAP 212 may generate an appropriate error message for operations targeting a managed entity that are not within the appropriate scope, for example, to an administrator or higher order management system or interface. In yet another embodiment, and EMAP 212 may redirect operations targeting a managed entity that are not within the appropriate scope to another managed entity, EMAP 212 or management system.

In one embodiment, the desktop management client application instructs the management component on the third physical machine via the EMAP 212. In another embodiment, the management component on the third physical machine may be a BMC 236, service processor, MAP, or other interface to the migrated desktop session. In another embodiment, upon modifying the migrated desktop session from the first level of activity to a second level of activity, the EMAP 212 updates the cache results and/or the directory service 282.

Figure 4:
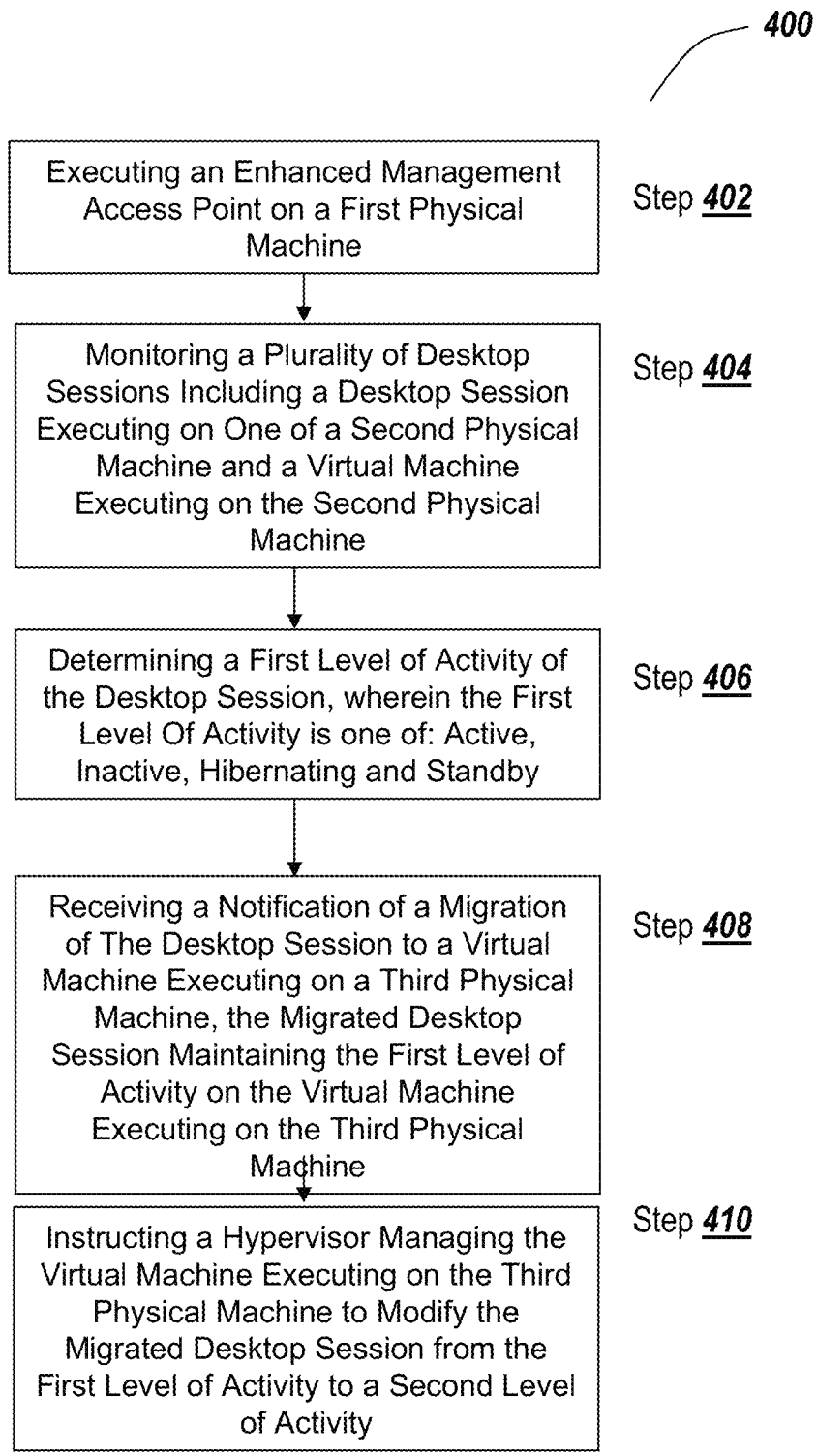
FIG. 4 is a flow diagram depicting another embodiment of a method for providing unified management of desktop sessions.

Referring now to FIG. 4, a flow diagram depicts one embodiment of the steps taken in a method 400 for using standards-based functionality to provide unified management for a plurality of remote desktop sessions by an enhanced management access point (EMAP). This unified management may be provided via out of band management communication. The method includes executing an enhanced management access point on a first physical machine (402). The method includes monitoring, by the enhanced management access point, a plurality of desktop sessions including a desktop session executing on one of a second physical machine and a virtual machine executing on the second physical machine (404). The desktop session can provide access to at least one application or file. The method includes determining, by the enhanced management access point, a first level of activity of the desktop session, wherein the first level of activity is one of: active, inactive, hibernating and standby (406). The method includes receiving, by the enhanced management access point, a notification of a migration of the desktop session to a virtual machine executing on a third physical machine, the migrated session maintaining the first level of activity on the virtual machine executing on the third physical machine (408). The method includes instructing, by the enhanced management access point, a hypervisor managing the virtual machine executing on the third physical machine to modify the migrated desktop session from the first level of activity to a second level of activity (410). The second level of activity can be one of: active, inactive, hibernating and standby.

Referring now to FIG. 4, and in greater detail, an EMAP 212 executes on a first physical machine (402). In one embodiment, the EMAP 212 is an EMAP 212 as described above in connection with FIG. 2 and FIG. 3, step 302.

The EMAP 212 monitors a plurality of desktop sessions including a desktop session executing on one of a second physical machine and a virtual machine executing on the second physical machine (404). In one embodiment, the desktop session can provide access to at least one application or file. In another embodiment, the EMAP 212 monitors a plurality of desktop sessions as described above in connection with FIG. 3, step 304.

The EMAP 212 determines a first level of activity of the desktop session (406). In one embodiment, the first level of activity may be one of: active, inactive, hibernating and standby. In another embodiment, the EMAP 212 can determine a first level of activity of the desktop session using one or more of the processes, communications, protocols, channels, standards and management functions discussed above in connection with FIG. 3, step 306. In still another embodiment, the EMAP 212 transmits information on the first level of activity of the desktop session to the desktop management client application 214.

The EMAP 212 receives a notification of a migration of the desktop session to a virtual machine executing on a third physical machine, the migrated desktop session maintaining the first level of activity on the third physical machine (408). In another embodiment, the EMAP 212 can receive a notification of a migration of the desktop session using one or more of the processes, communications, protocols, channels, standards and management functions discussed above in connection with steps 304, 306 and 308. In still another embodiment, for example, the EMAP 212 receives a notification of a migration of the desktop session by polling or querying a management process for the notification of the migration of the desktop session. In yet another embodiment, the management process is provided by at least one of: a hypervisor 244, virtualization software 230, a virtualization system 286, a virtual desktop management system 288, a provisioning system 286, and a directory service 282, any of which may provide information associated with the desktop session to a user or access to the desktop session.

In one embodiment, the EMAP 212 can determine a migration of the desktop session using one or more of the processes, communications, protocols, channels, standards and management functions discussed above in connection with steps 304, 306 and 308. In another embodiment, the EMAP 212 may initiate the migration of the desktop session. In still another embodiment, the EMAP 212 may initiate a migration of the desktop session via a physical-to-virtual (P2V) process. In yet another embodiment, the EMAP 212 may initiate a migration of the desktop session executing on the second physical machine to a virtual desktop session 232 provided by a virtual machine or hypervisor 244 executing on the third physical machine. In still even another embodiment, the EMAP 212 initiates a migration of a virtual desktop session 232 provided by a virtual machine or hypervisor 244 executing on the second physical machine, to a second virtual desktop session 232' provided by a second virtual machine or hypervisor 244' executing on the third physical machine.

In one embodiment, the EMAP 212 determines the third physical machine providing the migrated desktop session. In another embodiment, the third physical machine may not be accessible to the EMAP 212 because it is not managed by the EMAP 212. In still another embodiment, if the EMAP 212 cannot access the third physical machine, the EMAP 212 may cease to manage the associated desktop session. In yet another embodiment, the EMAP 212 may try to register, process or include the third physical machine for management by the EMAP.

The EMAP 212 instructs a hypervisor managing the virtual machine executing on the third physical machine to modify the migrated desktop session from the first level of activity to a second level of activity (410). In one embodiment, the second level of activity can be one of: active, inactive, hibernating and standby. In another embodiment, the second level of activity differs from the first level of activity. In still another embodiment, the second level of activity is the same or substantially similar to the first level of activity. In yet another embodiment, the EMAP 212 does not initiate or affect a change in the level of activity of the migrated desktop session. In still even another embodiment, the migrated desktop session is a virtual desktop session provided by a hypervisor 244 or virtual machine executing on the third physical machine.

In one embodiment, the EMAP 212 instructs the hypervisor 244 or virtualization software 230 on the third physical machine using one or more of the processes, communications, protocols, channels, standards and management functions discussed above in connection with steps 304 and 306. For example, in an embodiment, the EMAP 212 instructs the hypervisor 244 or virtualization software 230 on the third physical machine using DASH specifications. In another embodiment, the EMAP 212 instructs the hypervisor 244 or virtualization software 230 on the third physical machine using SMASH specifications. In still another embodiment, the EMAP 212 instructs the hypervisor 244 or virtualization software 230 via at least one of a provisioning system and a directory service, providing the migrated desktop session to a user.

In one embodiment, the desktop management client application instructs the hypervisor 244 or virtualization software 230 on the third physical machine via the EMAP 212. In another embodiment, the virtualization software 230 and/or virtualization system 284 may provide a virtualized BMC, service processor, MAP, or other virtualized interface to the migrated desktop session. In another embodiment, upon modifying the migrated desktop session from the first level of activity to a second level of activity, the EMAP 212 updates the cache results and/or the directory service 282.

In some embodiments, use of the methods and systems described herein allows management of virtual desktops via out-of-band management techniques. In one of these embodiments, a management interface accessed by a user, such as an administrator, or a management system is enhanced to provide seamless management of mobile, virtual desktops.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for using standards-based functionality to provide unified management, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for using standards-based functionality to provide unified management, via out of band management communication, for a plurality of remote desktop sessions by executing an enhanced management access point (EMAP) on a first physical machine that is communicating with the plurality of remote desktop sessions, the method comprising:

managing the plurality of remote desktop sessions via the out of band management communication;

accessing a directory service executing on a second physical machine, the directory service comprising information associated with the plurality of remote desktop sessions;

determining a location of each of the plurality of remote desktop sessions to be managed and polling and/or querying at least one of a third or a fourth physical machine providing the plurality of remote desktop sessions;

monitoring, by the EMAP, the plurality of remote desktop sessions and a plurality of server sessions including a server session executing on the third physical machine or a virtual machine executing on the third physical machine, wherein the server session provides access to at least one application or file;

determining, by the EMAP, a first level of activity of a desktop session executing on the third physical machine or a virtual machine executing on the third physical machine by accessing the directory service, wherein the first level of activity is one of: active, inactive, hibernating and standby;

receiving, by the EMAP, a notification of a migration of the desktop session to a fourth physical machine, the desktop session maintaining the first level of activity on the fourth physical machine;

instructing, by the EMAP, a management component on the fourth physical machine to modify the desktop session from the first level of activity to a second level of activity, wherein the second level of activity is different than the first level of activity and is one of: active, inactive, hibernating and standby;

updating, by the EMAP, the directory service to indicate the second level of activity of the desktop session responsive to the modification;

instructing, by the EMAP, the management component of the third physical machine to control a power level of the fourth physical machine; and isolating, by the EMAP, the third physical machine by turning off a network interface card (NIC) of the fourth physical machine.

2. The method of claim 1, wherein monitoring further comprises communicating with at least one of: a virtualization system, a virtual desktop management system, a provisioning system, and the directory service.

3. The method of claim 1, further comprising:
determining that the desktop session is not accessible; and
determining the first level of activity of the desktop session from cached information.

4. The method of claim 1, further comprising identifying the third physical machine providing the desktop session.

5. The method of claim 1, wherein receiving further comprises at least one of polling and querying a management process for the notification of the migration of the desktop session.

6. The method of claim 3, wherein the management process is provided by at least one of: a virtualization system, a virtual desktop management system, a provisioning system, and the directory service.

7. The method of claim 1, wherein instructing the management component on the fourth physical machine to modify the desktop session further comprises instructing the management component on the fourth physical machine using at least one of: a standards-based specification and a proprietary specification.

8. The method of claim 7, wherein instructing the management component on the fourth physical machine to modify the desktop session further comprises instructing the management component on the fourth physical machine using at least one of: Desktop and mobile Architecture for System Hardware (DASH) and System Management Architecture for Server Hardware (SMASH) specifications.

9. The method of claim 1, wherein instructing the management component on the fourth physical machine to modify the desktop session further comprises instructing the management component via at least one of a provisioning system and the directory service.

10. The method of claim 1, further comprising managing a desktop session executing on the second physical machine and a desktop session executing on the virtual machine in a same manner.

11. A method for using standards-based functionality to provide unified management, via out of band management communication, for a plurality of remote desktop sessions by executing an enhanced management access point (EMAP) on a first physical machine that is communicating with the plurality of remote desktop sessions, the method comprising:

managing the plurality of remote desktop sessions via the out of band management communication;

accessing a directory service executing on a second physical machine, the directory service comprising information associated with the plurality of remote desktop sessions;

determining a location of each of the plurality of remote desktop sessions to be managed and polling and/or querying at least one of a third or a fourth physical machine providing the plurality of remote desktop sessions;

monitoring, by the EMAP, the plurality of remote desktop sessions and a plurality of server sessions including a server session executing on the third physical machine or a virtual machine executing on the third physical machine, wherein the server session provides access to at least one application or file;

determining, by the EMAP, a first level of activity of a desktop session executing on the third physical machine or a virtual machine executing on the third physical machine by accessing the directory service, wherein the first level of activity is one of: active, inactive, hibernating and standby;

receiving, by the EMAP, a notification of a migration of the desktop session to a virtual machine executing on the fourth physical machine, the desktop session maintaining the first level of activity on the virtual machine executing on the fourth physical machine;

instructing, by the EMAP, a hypervisor managing the virtual machine executing on the fourth physical machine to modify the desktop session from the first level of activity to a second level of activity, wherein the second level of activity is different than the first level of activity and is one of: active, inactive, hibernating and standby;

updating, by the EMAP, the directory service to indicate the second level of activity of the desktop session responsive to the modification;

instructing, by the EMAP, a management component of the fourth physical machine to control a power level of the fourth physical machine; and isolating, by the EMAP, the fourth physical machine by turning off a network interface card (NIC) of the fourth physical machine.

12. The method of claim 11, wherein monitoring further comprises communicating with at least one of: a virtualization system, a virtual desktop management system, a provisioning system, and the directory service.

13. The method of claim 11, further comprising:
determining that the desktop session is not accessible; and
determining the first level of activity of the desktop session from cached information.

14. The method of claim 11, further comprising identifying the third physical machine providing the desktop session.

15. The method of claim 11, wherein receiving further comprises at least one of polling and querying a management process for the notification of the migration of the desktop session.

16. The method of claim 15, wherein the management process is provided by at least one of: a virtualization system, a virtual desktop management system, a provisioning system, and the directory service.

17. The method of claim 11, wherein instructing further comprises instructing the hypervisor executing on the fourth physical machine using at least one of: a standards-based specification and a proprietary specification.

18. The method of claim 17, wherein instructing further comprises instructing the hypervisor executing on the fourth physical machine using at least one of: Desktop and mobile Architecture for System Hardware (DASH) and System Management Architecture for Server Hardware (SMASH) specifications.

19. The method of claim 11, wherein instructing further comprises instructing the hypervisor via at least one of: a virtualization system, a virtual desktop management system, a provisioning system, and the directory service.

20. The method of claim 11, further comprising managing a desktop session executing on the second physical machine and a desktop session executing on the virtual machine in a same manner.

21. A system for using standards-based functionality to provide unified management, via out of band management communication, for a plurality of remote desktop sessions by executing an enhanced management access point (EMAP) on a first physical machine that is communicating with the plurality of remote desktop sessions, comprising:
a processor;
means for managing a plurality of remote desktop sessions via the out of band management communication;
means for accessing a directory service executing on a second physical machine, the directory service comprising information associated with the plurality of remote desktop sessions;
means for determining a location of each of the plurality of remote desktop sessions to be managed and polling and/or querying at least one of a third or a fourth physical machine providing the plurality of remote desktop sessions;
means for monitoring the plurality of remote desktop sessions and a plurality of server sessions including a server session executing on the third physical machine or a virtual machine executing on the third physical machine, wherein the server session provides access to at least one application or file;
means for determining a first level of activity of a desktop session executing on the third physical machine or a virtual machine executing on the third physical machine by accessing the directory service, wherein the first level of activity is one of: active, inactive, hibernating and standby;
means for receiving a notification of a migration of the desktop session to a fourth physical machine, the desktop session maintaining the first level of activity on the fourth physical machine;
means for instructing, by the EMAP, a management component on the fourth physical machine to modify the desktop session from the first level of activity to a second level of activity, wherein the second level of activity is different than the first level of activity and is one of: active, inactive, hibernating and standby;
means for updating, by the EMAP, the directory service to indicate the second level of activity of the desktop session responsive to the modification;
means for instructing, by the EMAP, a management component on the fourth physical machine, to control a power level of the fourth physical machine; and
means for isolating, by the EMAP, the fourth physical machine by turning off a network interface card (NIC) of the fourth physical machine.

22. A system for using standards-based functionality to provide unified management, via out of band management communication, for a plurality of remote desktop sessions by executing an enhanced management access point (EMAP) on a first physical machine that is communicating with the plurality of remote desktop sessions, the system comprising:
a processor;
means for managing a plurality of remote desktop sessions via the out of band management communication;
means for accessing a directory service executing on a second physical machine, the directory service comprising information associated with the plurality of remote desktop sessions;
means for determining a location of each of the plurality of remote desktop sessions to be managed and polling and/or querying at least one of a third or a fourth physical machine providing the plurality of remote desktop sessions;
means for monitoring the plurality of remote desktop sessions and a plurality of server sessions including a server session executing on the third physical machine or a virtual machine executing on the third physical machine, wherein the server session provides access to at least one application or file;
means for determining a first level of activity of a desktop session executing on the third physical machine or a virtual machine executing on the third physical machine by accessing the directory service, wherein the first level of activity is one of: active, inactive, hibernating and standby;
means for receiving a notification of a migration of the desktop session to a virtual machine executing on a fourth physical machine, the desktop session maintaining the first level of activity on the virtual machine executing on the fourth physical machine;
means for instructing, by the EMAP, a hypervisor managing the virtual machine executing on the fourth physical machine to modify the desktop session from the first level of activity to a second level of activity, wherein the second level of activity is different than the first level of activity and is one of: active, inactive, hibernating and standby;
means for updating, by the EMAP, the directory service to indicate the second level of activity of the desktop session responsive to the modification;
means for instructing, by the EMAP, a management component of the third physical machine to control a power level of the fourth physical machine; and
means for isolating, by the EMAP, the fourth physical machine by turning off a network interface card (NIC) of the fourth physical machine.

* * * * *